US010468024B2

(12) United States Patent
Nishikawa et al.

(10) Patent No.: US 10,468,024 B2
(45) Date of Patent: Nov. 5, 2019

(54) INFORMATION PROCESSING METHOD AND NON-TEMPORARY STORAGE MEDIUM FOR SYSTEM TO CONTROL AT LEAST ONE DEVICE THROUGH DIALOG WITH USER

(71) Applicant: Panasonic Intellectual Property Corporation of America, Torrance, CA (US)

(72) Inventors: Yuri Nishikawa, Kanagawa (JP); Katsuyoshi Yamagami, Osaka (JP)

(73) Assignee: PANAONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 44 days.

(21) Appl. No.: 15/730,848

(22) Filed: Oct. 12, 2017

(65) Prior Publication Data

US 2018/0122366 A1  May 3, 2018

Related U.S. Application Data

(60) Provisional application No. 62/416,220, filed on Nov. 2, 2016.

(30) Foreign Application Priority Data

Jan. 26, 2017 (JP) .................................. 2017-012338
Jul. 27, 2017 (JP) .................................. 2017-145693

(51) Int. Cl.
*G10L 15/22* (2006.01)
*G06F 3/16* (2006.01)

(52) U.S. Cl.
CPC .............. *G10L 15/22* (2013.01); *G06F 3/167* (2013.01); *G10L 2015/223* (2013.01)

(58) Field of Classification Search
CPC ........ G10L 15/00; G10L 15/26; G10L 15/265
See application file for complete search history.

(56) References Cited

U.S. PATENT DOCUMENTS 7,689,424 B2 *  3/2010  Monne .................... G10L 15/30
                                                             704/231
9,070,367 B1 *  6/2015  Hoffmeister .......... G10L 15/187
(Continued)

FOREIGN PATENT DOCUMENTS

JP          2014-106523          6/2014

OTHER PUBLICATIONS

Extended European Search Report dated Mar. 19, 2018 in European Application No. 17198542.7.

*Primary Examiner* — Paras D Shah
(74) *Attorney, Agent, or Firm* — Wenderoth, Lind & Ponack, L.L.P.

(57) ABSTRACT

A method includes: acquiring first voice information indicating a voice of a user input from a microphone; outputting, to a server via a network, first text string information generated from the first voice information, when the first text string information does not match any of pieces of text string information in the first database; acquiring, from the server, first semantic information and/or a control command corresponding to the first semantic information, when a second database includes a piece of text string information matched with the first text string information and the matched piece of text string information is associated with the first semantic information therein; instructing at least one device to execute an operation based on the first semantic information and/or the control command; and outputting, to a speaker, second voice information generated from second text string information, the second text string information being registered and associated with the first semantic information in the first database.

16 Claims, 27 Drawing Sheets

(56) References Cited

U.S. PATENT DOCUMENTS

| | | | |
|---|---|---|---|
| 2002/0072905 A1* | 6/2002 | White | G10L 15/30 704/231 |
| 2004/0128135 A1* | 7/2004 | Anastasakos | G10L 15/30 704/270.1 |
| 2010/0057450 A1* | 3/2010 | Koll | G10L 15/30 704/231 |
| 2011/0184740 A1* | 7/2011 | Gruenstein | G10L 15/32 704/275 |
| 2013/0132089 A1* | 5/2013 | Fanty | G10L 21/00 704/270 |
| 2013/0218572 A1* | 8/2013 | Cho | G06F 3/167 704/275 |
| 2014/0095176 A1* | 4/2014 | Kim | H04N 5/4403 704/275 |
| 2014/0191949 A1* | 7/2014 | Park | G06F 3/167 345/156 |
| 2014/0195244 A1* | 7/2014 | Cha | G06F 3/167 704/270.1 |
| 2014/0337032 A1* | 11/2014 | Aleksic | G10L 15/32 704/257 |
| 2015/0120296 A1* | 4/2015 | Stern | G10L 15/30 704/236 |
| 2017/0256260 A1* | 9/2017 | Jeong | G06F 3/16 |

* cited by examiner

FIG. 11

| TEXT STRING | SEMANTIC TAG | LOCAL DICTIONARY DATABASE REGISTRATION STATUS |
|---|---|---|
| HEATER | <heater_on> | ○ |
| MAKE IT WARMER | <heater_on> | ○ |
| I'M SUPER COLD | <heater_on> | — |
| SHIVERING | <heater_on> | — |
| COOLER | <cooler_on> | ○ |
| I'M MELTING | <cooler_on> | — |
| ... | ... | ... |

INFORMATION PROCESSING METHOD AND NON-TEMPORARY STORAGE MEDIUM FOR SYSTEM TO CONTROL AT LEAST ONE DEVICE THROUGH DIALOG WITH USER

BACKGROUND

1. Technical Field

The present disclosure relates to an information processing method and a storage medium for a system to control at least one device through dialog with a user.

2. Description of the Related Art

In recent years, much attention has been focused on devices such as home electric appliances that can be controlled using speech recognition. There has been a problem with these devices in that the storage capacity of the local-side device, such as a home electric appliance, is restricted. This means that the vocabulary that can be registered is restricted, and the user has had to remember restricted speech phrases. As a result, as of recent there is more attention being directed to spoken dialog controlled at a cloud server. This is advantageous since the capacity of a cloud server is great, so dictionaries having a rich vocabulary can be constructed, and the dictionary can be frequently updated, and accordingly can handle various expressions that the user uses. On the other hand, there is a problem in that communication time between the cloud server and the device takes around 500 ms to several seconds round trip, so there is a delay in the spoken dialog large enough that the user can recognize it.

For example, Japanese Unexamined Patent Application Publication No. 2014-106523 discloses an example of speech recognition technology, in which a device and program perform speech control of a device related to consumer electric products, using speech commands. The device and program improve the rate of recognition of a local-side terminal device, by transmitting, from a speech input handling device that functions as a center to the terminal device, synonyms corresponding to expressions unique to the user that are lacking in the dictionary at the terminal device.

SUMMARY

In one general aspect, the techniques disclosed here feature an information processing method to be executed at least in part in a computer for controlling at least one device through dialog with a user. The method includes: acquiring first voice information indicating the voice of the user input from a microphone; outputting, to a server via a network, first text string information generated from the first voice information, when determining, by referencing a first database, that the first text string information does not match any of pieces of text string information registered in the first database; acquiring, from the server via the network, first semantic information and/or a control command corresponding to the first semantic information, when a second database stored in the server includes a piece of text string information matched with the first text string information and the matched piece of text string information is associated with the first semantic information in the second database; instructing the at least one device to execute an operation based on the first semantic information and/or the control command; and outputting, to a speaker, second voice information generated from second text string information, the second text string information being registered and associated with the first semantic information in the first database.

It should be noted that comprehensive or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a specific example of a cloud dictionary database according to the embodiment;

DETAILED DESCRIPTION

Figure 1A:
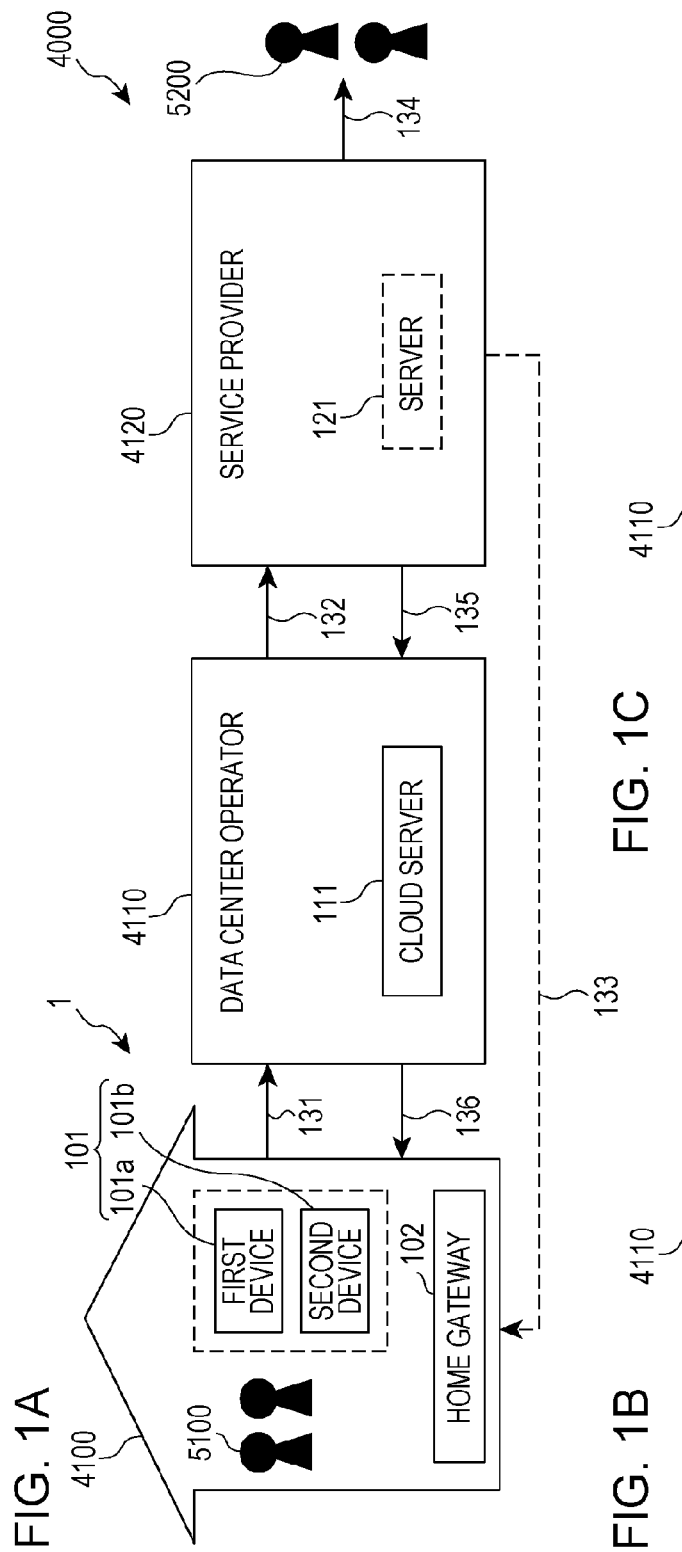
FIG. 1A is a diagram illustrating an example of an environment where a spoken dialog agent system having a speech processing device according to an embodiment is installed, and is a diagram illustrating an overall image of service provided by an information management system having the spoken dialog agent system.

[Underlying Knowledge Forming Basis for Technology of the Present Disclosure]

The Present Inventors have found that the following problem occurs in the conventional art such as that disclosed in Japanese Unexamined Patent Application Publication No. 2014-106523. The device and program according to the above-described Japanese Unexamined Patent Application Publication No. 2014-106523 learn synonyms at a local-side device. Accordingly, the local-side device increases the scale of the storage region as it learns synonyms, regardless of the fact that the storage capacity is restricted. The Present Inventors have studied the following improvement measures.

The speech processing device according to an aspect of the present disclosure includes an acquisition unit configured to acquire recognized text information obtained by speech recognition processing, a storage unit configured to store, out of a first dictionary, first dictionary information including information correlating at least text information and task information, a matching unit configured to, based on the first dictionary information, identify at least one of the text information and task information corresponding to recognized text information, using at least one of text information and task information registered in the first dictionary, and at least one of text information and task information identified from a second dictionary of the matching unit that differs from the first dictionary, and recognized text information, and an output unit configured to output presentation information regarding at least one of the text information and task information corresponding to the recognized text information identified by the matching unit. The presentation information includes information relating to suggested text information. Suggested text information is text information registered in both the first dictionary and the second dictionary, task information that corresponds to the suggested text information corresponds to task information that corresponds to recognized text information. The suggested text information is different from the recognized text information.

In the above-described aspect, presentation information including information relating to suggested text information is output. Task information corresponding to suggested text information corresponds to task information of recognized text information. Further, suggested text information is registered in both the first dictionary and the second dictionary. For example, in a case where recognized text information is only registered in one of the dictionaries, suggested text information is suggested by output of presentation information. Thus, speaking in accordance with the suggested text information does away with the need of matching information between the first dictionary and the second dictionary in processing relating to task information corresponding to text information recognized from this speech. That is to say, exchange of information between the device having the first dictionary and the device having the second dictionary is reduced. Thus, processing speed relating to the task information improves. That is to say, for example, in a case of the user speaking a speech phrase only registered in the one dictionary, a speech phrase that is registered in the other dictionary and performs the same processing as this speech phrase is suggested to the user, so response in performing device control by the user using the other dictionary by voice is improved. Note that the first dictionary information may be the first dictionary itself.

In the speech processing device according to the above aspect, for example, an arrangement may be made where the storage unit stores the second dictionary, the matching unit identifies in the second dictionary task information corresponding to recognized text information, and other text information that corresponds to task information corresponding to the recognized text information and also is different from the recognized text information, the suggested text information includes the other text information, and the presentation information includes task information corresponding to the recognized text information, and information relating to the suggested text information.

In the above aspect, task information corresponding to recognized text information in the second dictionary, and information relating to suggested text information including other text information different from the recognized text information in the second dictionary, are identified and output. For example, in a case where recognized text information is not registered in the first dictionary but is registered in the second dictionary, speech processing device identifies the task information and suggested text information using the second dictionary. Accordingly, identifying processing of the task information and suggested text information can be performed at the speech processing device storing the second dictionary alone, so processing speed can be improved.

In the speech processing device according to the above aspect, the other text information may be text information registered in the first dictionary as well, for example.

In the speech processing device according to the above aspect, a plurality of pieces may be identified of the other text information, part of the plurality of pieces of other text information being text information also registered in the first dictionary, for example.

In the above aspect, the plurality of pieces of other information may include text information registered in the first dictionary and text information not registered in the first dictionary. Accordingly, text information registered in the first dictionary can be extracted by matching the aforementioned plurality of pieces of other text information with the first dictionary. Note that it is sufficient for the speech processing device to extract text information where task information corresponds with the recognized text information, and there is no need to distinguish whether the extracted text information is registered in the first dictionary or the second dictionary. This improves the versatility of the speech processing device.

In the speech processing device according to the above aspect, the output unit may include a communication unit that transmits the presentation information, for example.

In the above aspect, the speech processing device outputs presentation information by communication. Accordingly, the speech processing device can output presentation information to a remote device.

The speech processing device according to the above aspect may further include a communication unit that receives task information identified from the second dictionary and recognized text information, for example, the first dictionary information being the first dictionary, and the matching unit identifying text information corresponding to received task information in the first dictionary as suggested text information.

In the above aspect, even in a case where the speech processing device can only acquire task information corresponding to the recognized text information, as at least one of text information and task information identified from the second dictionary and recognized text information, suggested text information can be acquired and output, using the acquired task information. This simplifies processing of identifying at least one of text information and task information identified from the second dictionary and recognized text information.

The speech processing device according to the above aspect may further include a communication unit that receives text information identified by the second dictionary and recognized text information, for example, the first dictionary information being the first dictionary, and the matching unit identifying text information in the received text information that is registered in the first dictionary as suggested text information.

In the above aspect, even in a case where the speech processing device can only acquire text information corresponding identified from the second dictionary and the recognized text information, as at least one of text information and task information identified from the second dictionary and recognized text information, suggested text information can be acquired and output, using the acquired information. This simplifies processing of identifying at least one of text information and task information identified from the second dictionary and recognized text information.

In the speech processing device according to the above aspect, for example, the output unit may further include a presentation control unit that presents presentation information on a presentation device.

In the above aspect, the speech processing device can display presentation information on a separate presentation device, thereby notifying the user.

In the speech processing device according to the above aspect, the task information may include at least one of semantic information relating to the meaning of text information and control information for controlling actions of the device, with semantic information and control information being correlated, and text information being correlated with at least one of the semantic information and control information.

In the above aspect, control based on text information is smooth, due to the text information being correlated with at least one of the semantic information and control information.

A speech processing method according to one aspect of the present disclosure includes acquiring recognized text information obtained by speech recognition processing, identifying at least one of text information and task information corresponding to recognized text information, using at least one of text information and task information registered in a first dictionary, and at least one of text information and task information identified from a second dictionary that differs from the first dictionary, and recognized text information, based on first dictionary information having information correlating at least text information and task information of the first dictionary, and outputting presentation information regarding at least one of the text information and task information corresponding to the recognized text information. The presentation information includes information relating to suggested text information, suggested text information is text information registered in both the first dictionary and the second dictionary, task information that corresponds to the suggested text information corresponds to task information that corresponds to recognized text information, and the suggested text information is different from the recognized text information.

A program according to one aspect of the present disclosure causes a computer to execute the functions of acquiring recognized text information obtained by speech recognition processing, identifying at least one of text information and task information corresponding to recognized text information, using at least one of text information and task information registered in a first dictionary, and at least one of text information and task information identified from a second dictionary that differs from the first dictionary, and recognized text information, based on first dictionary information having information correlating at least text information and task information of the first dictionary, and outputting presentation information regarding at least one of the text information and task information corresponding to the recognized text information. The presentation information includes information relating to suggested text information, suggested text information is text information registered in both the first dictionary and the second dictionary, task information that corresponds to the suggested text information corresponds to task information that corresponds to recognized text information, and the suggested text information is different from the recognized text information.

These general or specific aspects may be realized by a system, method, integrated circuit, computer program, or computer-readable recording medium such as a CD-ROM, and may be realized by any combination of a system, method, integrated circuit, computer program, and recording medium.

The following is a detailed description of an embodiment with reference to the drawings. Note that the embodiments described below are all specific examples of the technology of the present disclosure. Accordingly, values, shapes components, steps, the order of steps, and so forth illustrated in the following embodiments, are only exemplary, and do not restrict the present disclosure. Components in the following embodiments which are not included in an independent Claim indicating a highest order concept are described as optional components. Also, the contents of all embodiments may be combined.

Note that in the present disclosure, "at least one of A and B" is to be understood to mean the same as "A and/or B".

Embodiment

[Overall Image of Provided Service]

Figure 1C:
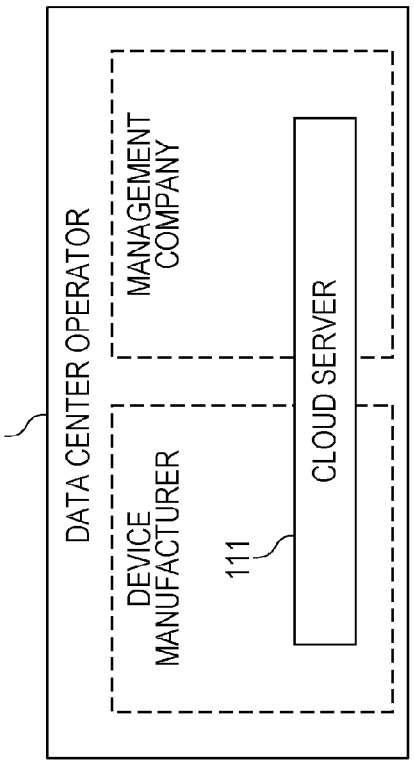
FIG. 1C is a diagram illustrating an example where either one or both of a device manufacturer and a management company serves as the data center operator in FIG. 1A.
Figure 1B:
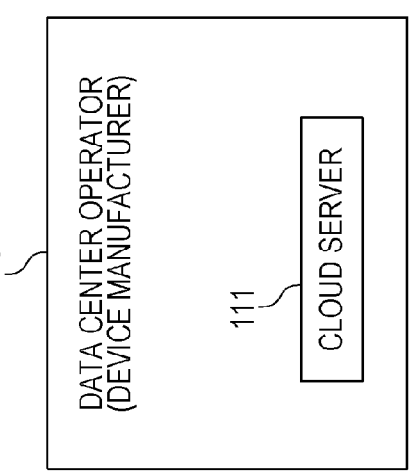
FIG. 1B is a diagram illustrating an example where a device manufacturer serves as the data center operator in FIG. 1A.

First, an overall image of the service which a spoken dialog management system, in which a spoken dialog agent system 1 having a speech processing device according to an embodiment is disposed, provides, will be described with reference to FIGS. 1A through 1C. FIG. 1A is a diagram illustrating an example of an environment where a spoken dialog agent system having a speech processing device according to the embodiment is installed, and is a diagram illustrating an overall image of service provided by an information management system having the spoken dialog agent system. FIG. 1B is a diagram illustrating an example where a device manufacturer serves as the data center operator in FIG. 1A. FIG. 1C is a diagram illustrating an example where either one or both of a device manufacturer and a management company serves as the data center operator in FIG. 1A. Note that the speech processing device may be a later-described home gateway (also referred to as "local server") 102, or may be a cloud server 111, or may be an arrangement that includes the home gateway 102 and cloud server 111.

An information management system 4000 includes a group 4100, a data center operator 4110, and service provider 4120, as illustrated in FIG. 1A. The group 4100 is, for example, a corporation, an organization, a home, or the like. The scale thereof is irrelevant. The group 4100 has multiple devices 101 including a first device 101a and a second device 101b, and a home gateway 102. An example of multiple devices 101 is home electric appliances. The multiple devices 101 may include those which are capable of connecting to the Internet, such as a smartphone, personal computer (PC), television set, etc., and may also include those which are incapable of connecting to the Internet on their own, such as lighting, washing machine, refrigerator, etc., for example. The multiple devices 101 may include those which are incapable of connecting to the Internet on their own but can be connected to the Internet via the home gateway 102. A user 5100 uses the multiple devices 101 within the group 4100.

The data center operator 4110 includes a cloud server 111. The cloud server 111 is a virtual server which collaborates with various devices over a communication network such as the Internet. The cloud server 111 primarily manages enormously large data (big data) or the like that is difficult to handle with normal database management tools and the like. The data center operator 4110 manages data, manages the cloud server 111, and serves as an operator of a data center which performs the management. The services provided by the data center operator 4110 will be described in detail later. Note that description will be made hereinafter that the Internet is used as the communication network, but the communication network is not restricted to the Internet.

Now, the data center operator 4110 is not restricted just to management of data and management of the cloud server 111. For example, in a case where an appliance manufacturer which develops or manufactures one of the electric appliances of the multiple devices 101 manages the data or manages the cloud server 111 or the like, the appliance manufacturer serves as the data center operator 4110, as illustrated in FIG. 1B. Also, the data center operator 4110 is not restricted to being a single company. For example, in a case where an appliance manufacturer and a management company manage data or manage the cloud server 111 either conjointly or in shared manner, as illustrated in FIG. 1C, both, or one or the other, serve as the data center operator 4110.

The service provider 4120 includes a server 121. The scale of the server 121 here is irrelevant, and also includes memory or the like in a PC used by an individual, for example. Further, there may be cases where the service provider 4120 does not include a server 121.

Note that the home gateway 102 is not indispensable to the above-described information management system 4000. In a case where the cloud server 111 performs all data management for example, the home gateway 102 is unnecessary. Also, there may be cases where there are no devices incapable of Internet connection by themselves, such as in a case where all devices 101 in the home are connected to the Internet.

Next, the flow of information in the information management system 4000 will be described. The first device 101a and the second device 101b in the group 4100 each transmit log information to the cloud server 111 of the data center operator 4110. The cloud server 111 collects log information from the first device 101a and second device 101b (arrow 131 in FIG. 1A). Here, log information is information indicating the operating state of the multiple devices 101 for example, date and time of operation, and so forth. For example, log information includes television viewing history, recorder programming information, date and time of the washing machine running, amount of laundry, date and time of the refrigerator door opening and closing, number of times of the refrigerator door opening and closing, and so forth, but is not restricted to these, and various types of information which can be acquired from the various types of devices 101 may be included. The log information may be directly provided to the cloud server 111 from the multiple devices 101 themselves over the Internet. Alternatively, the log information may be temporarily collected from the multiple devices 101 to the home gateway 102, and be provided from the home gateway 102 to the cloud server 111.

Next, the cloud server 111 of the data center operator 4110 provides the collected log information to the service provider 4120 in a certain increment. The certain increment here may be an increment in which the data center operator 4110 can organize the collected information and provide to the service provider 4120, or may be in increments requested by the service provider 4120. Also, the log information has been described as being provided in certain increments, but the amount of provided information of the log information may change according to conditions, rather than being provided in certain increments. The log information is saved in the server 121 which the service provider 4120 has, as necessary (arrow 132 in FIG. 1A).

The service provider 4120 organizes the log information into information suitable for the service to be provided to the user, and provides to the user. The user to which the information is to be provided may be the user 5100 who uses the multiple devices 101, or may be an external user 5200. An example of a way to provide information to the users 5100 and 5200 may be to directly provide information from the service provider 4120 to the users 5100 and 5200 (arrows 133 and 134 in FIG. 1A), for example. Also, an example of a way to provide information to the user 5100 may be to route the information to the user 5100 through the cloud server 111 of the data center operator 4110 again, for example (arrows 135 and 136 in FIG. 1A). Alternatively, the cloud server 111 of the data center operator 4110 may organize the log information into information suitable for the service to be provided to the user, and provide to the service provider 4120. Also, the user 5100 may be different from the user 5200 or may be the same.

[Configuration of Spoken Dialog Agent System]

The following is a description of the configuration of the spoken dialog agent system 1 according to the embodiment. The spoken dialog agent system 1 is a system which, in a case of the user speaking a speech phrase registered only in a cloud-side dictionary, recommends to the user a speech phrase registered in a local-side dictionary that performs the same processing. At this time, the spoken dialog agent system 1 appropriately recommends a speech phrase to the user regarding which the local-side device can speedily respond to. This improves the response of the spoken dialog agent system 1 when the user is performing device control.

With regard to the configuration of the spoken dialog agent system 1, description will first be made below in order regarding the hardware configuration of a voice input/output device, the hardware configuration of a device, the hardware configuration of a local server, the hardware configuration of a cloud server, functional blocks of the voice input/output device, functional blocks of the device, functional blocks of the local server, and functional blocks of the cloud server. Thereafter, with regard to the operations of the spoken dialog agent system 1, description will be made in order regarding the sequence of processing for recommending a speech phrase that the terminal side, i.e., local side, can speedily respond to, and the flow of cloud dictionary matching processing by the spoken dialog agent system 1.

Figure 2:
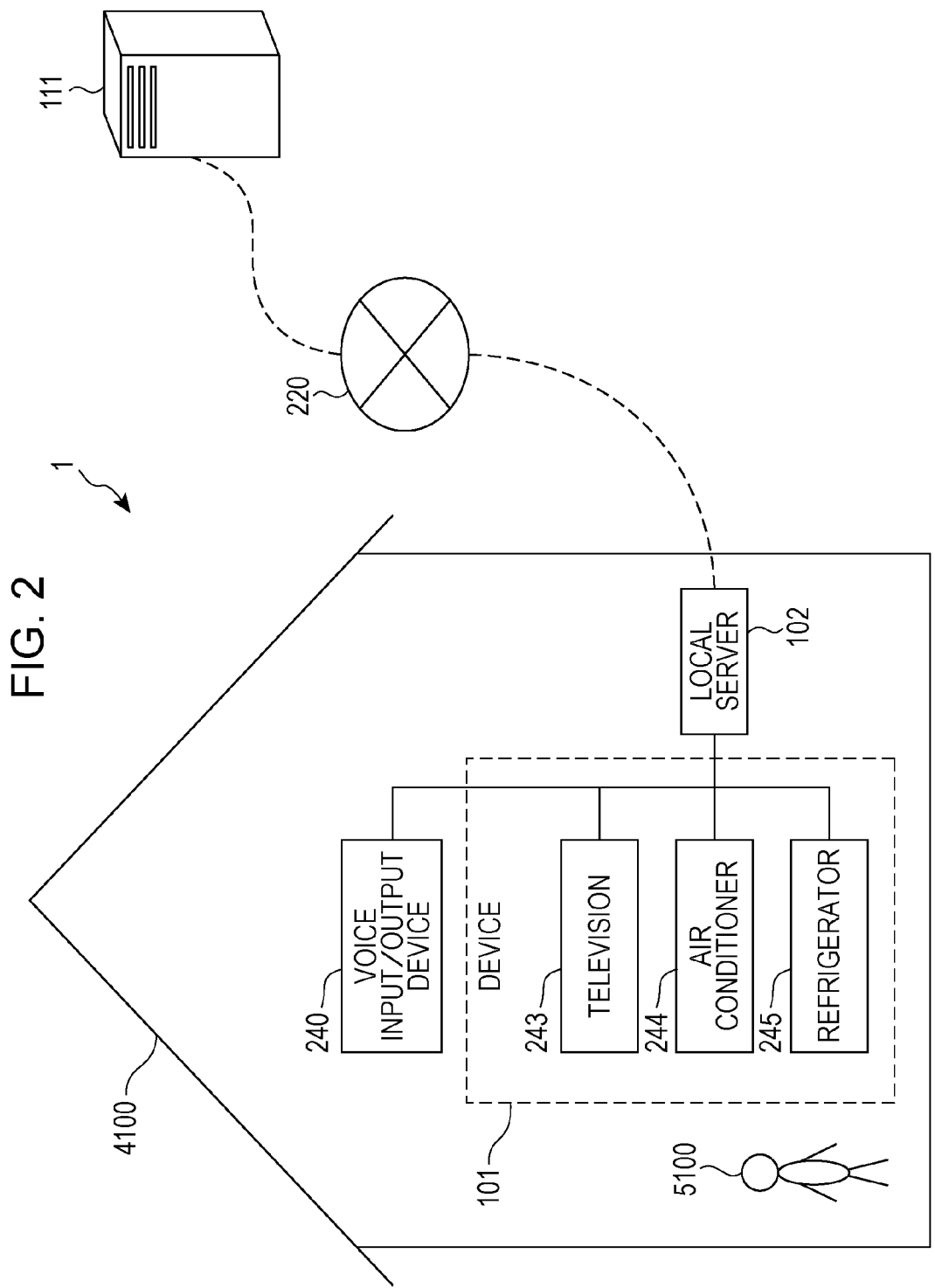
FIG. 2 is a schematic diagram illustrating the configuration of a spoken dialog agent system according to the embodiment.

The configuration of the spoken dialog agent system 1 according to the embodiment will be described with reference to FIG. 2. FIG. 2 is a schematic diagram illustrating the configuration of the spoken dialog agent system 1 according to the embodiment. The spoken dialog agent system 1 includes a voice input/output device 240, multiple devices 101, the local server 102, an information communication network 220, and the cloud server 111. The local server 102 is an example of a home gateway. The information communication network 220 is an example of a communication network, the Internet for example. The multiple devices 101 are a television set 243, an air conditioner 244, and a refrigerator 245 in the embodiment. The multiple devices 101 are not restricted to the devices which are the television set 243, air conditioner 244, and the refrigerator 245, and any device may be included. The voice input/output device 240, multiple devices 101, and local server 102, are situated in the group 4100. The local server 102 may make up the speech processing device, the cloud server 111 may make up the speech processing device, or the local server 102 and cloud server 111 may make up the speech processing device together.

In the example illustrated in FIG. 2, the user 5100, who is a person, is present in the group 4100 where the spoken dialog agent system 1 is situated. The user 5100 also is the one who speaks to the spoken dialog agent system 1.

The voice input/output device 240 is an example of a sound collection unit which collects voice within the group 4100, and a voice output unit which outputs voice to the group 4100. The group 4100 is a space where the voice input/output device 240 can provide information to the users by voice. The voice input/output device 240 recognizes the voice of the user 5100 in the group 4100, and provides voice information from the voice input/output device 240, and also controls the multiple device 101, in accordance with instructions by the user 5100 by the recognized voice input. More specifically, the voice input/output device 240 displays contents, replies to user questions from the user 5100, and controls the devices 101, in accordance with instructions by the user 5100 by the recognized voice input.

Also here, connection of the voice input/output device 240, the multiple devices 101, and the local server 102, can be performed by wired or wireless connection. Various types of wireless communication are applicable for wireless connection, including, for example, local area networks (LAN) such as Wireless Fidelity (Wi-Fi, a registered trademark) and so forth, and Near-Field Communication such as Bluetooth (a registered trademark), ZigBee (a registered trademark), and so forth.

Also, at least part of the voice input/output device 240, local server 102, and devices 101 may be integrated. For example, the functions of the local server 102 may be built into the voice input/output device 240, with the voice input/output device 240 functioning as a local terminal communicating with the cloud server 111 by itself. Alternatively, the voice input/output device 240 may be built into each of the devices 101, or one of the multiple devices 101. In the case of the latter, the device 101 into which the voice input/output device 240 has been built in may control the other devices 101. Alternatively, of the functions of the voice input/output device 240 and the functions of the local server 102, at least the functions of the local server 102 may be built into each of the devices 101, or one of the multiple devices 101. In the case of the former, each device 101 may function as a local terminal communicating with the cloud server 111 by itself. In the case of the latter, the other devices 101 may communicate with the cloud server 111 via the one device 101 that is a local terminal in which the functions of the local server 102 have been built in.

Figure 3:
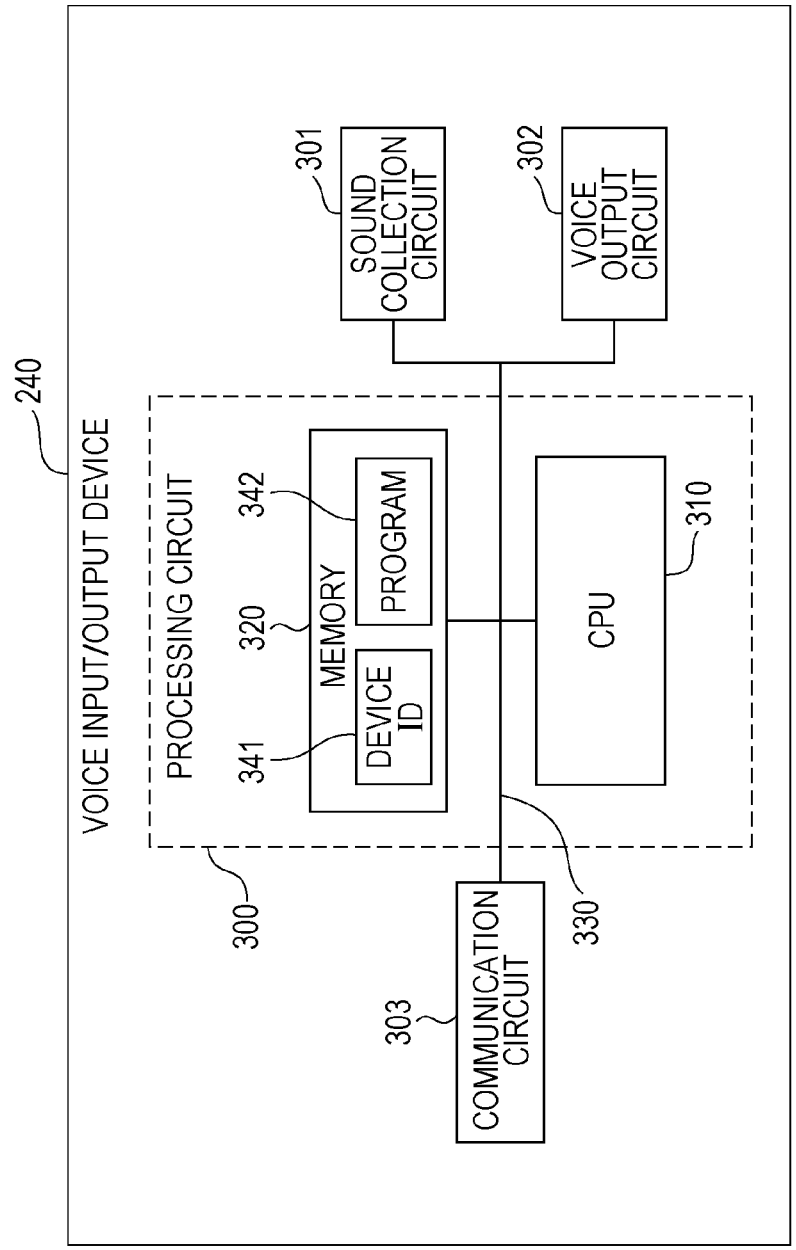
FIG. 3 is a diagram illustrating an example of the hardware configuration of a voice input/output device according to the embodiment.

Further, the voice input/output device 240, devices 101, local server 102, and cloud server 111 will be described from the perspective of hardware configuration. FIG. 3 is a diagram illustrating an example of the hardware configuration of the voice input/output device 240 according to the embodiment. As illustrated in FIG. 3, the voice input/output device 240 has a processing circuit 300, a sound collection circuit 301, a voice output circuit 302, and a communication circuit 303. The processing circuit 300, sound collection circuit 301, voice output circuit 302, and communication circuit 303, are mutually connected by a bus 330, and can exchange data and commands with each other.

The processing circuit 300 may be realized by a combination of a central processing unit (CPU) 310, and memory 320 storing a device ID 341 and computer program 342. The CPU 310 controls the operations of the voice input/output device 240, and also may control the operations of the devices 101 connected via the local server 102. In this case, the processing circuit 300 transmits control commands to the devices 101 via the local server 102, but may directly transmit to the devices 101. The CPU 310 executes a command group described in the computer program 342 loaded to the memory 320. Accordingly, the CPU 310 can realize various types of functions. A command group to realize the later-described actions of the voice input/output device 240 is written in the computer program 342. The above-described computer program 342 may be stored in the memory 320 of the voice input/output device 240 beforehand, as a product. Alternatively, the computer program 342 may be recorded on a recording medium such as a Compact Disc Read-Only Memory (CD-ROM) and distributed through the market as a product, or may be transmitted over electric communication lines such as the Internet, and the computer program 342 acquired by way of the recording medium or electric communication lines may be stored in the memory 320.

Alternatively the processing circuit 300 may be realized as dedicated hardware configured to realize the operations described below. Note that the device ID 341 is an identifier uniquely assigned to the device 101. The device ID 341 may be independently assigned by the manufacturer of the device 101, or may be a physical address uniquely assigned on a network (a so-called Media Access Control (MAC) address) as a principle.

Description has been made regarding FIG. 3 that the device ID 341 is stored in the memory 320 where the computer program 342 is stored. However, this is one example of the configuration of the processing circuit 300. The computer program 342 may be stored in random access memory (RAM) or ROM, and the device ID 341 stored in flash memory, for example.

The sound collection circuit 301 collects user voice and generates analog voice signals, and converts the analog voice signals into digital data which is transmitted to the bus 330.

The voice output circuit 302 converts the digital data received over the bus 330 into analog voice signals, and outputs these analog voice signals.

The communication circuit 303 is a circuit for communicating with another device (e.g., the local server 102) via a wired communication or wireless communication. The communication circuit 303 performs communication with another device via a network, for example via a wired LAN such as a network conforming to the Ethernet (a registered trademark) standard in the present embodiment, although this is not restrictive. The communication circuit 303 transmits log information and ID information generated by the processing circuit 300 to the local server 102. The communication circuit 303 also transmits signals received from the local server 102 to the processing circuit 300 via the bus 330.

The voice input/output device 240 may include, besides the components that are illustrated, other components for realizing functions required of that device.

Figure 4:
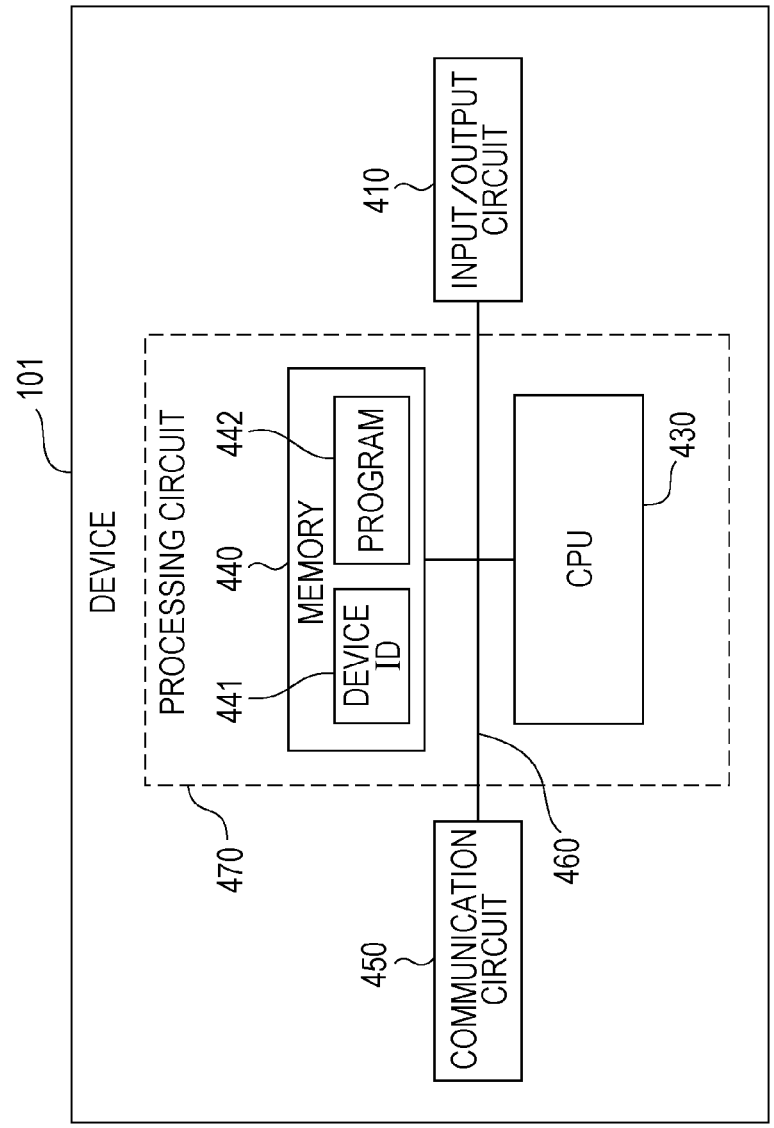
FIG. 4 is a diagram illustrating an example of the hardware configuration of a device according to the embodiment.

FIG. 4 is a diagram illustrating an example of the hardware configuration of a device 101 according to the embodiment. The television set 243, air conditioner 244, and refrigerator 245 in FIG. 2 are examples of the device 101. The device 101 includes an input/output circuit 410, a communication circuit 450, and a processing circuit 470, as illustrated in FIG. 4. These are mutually connected by a bus 460, and can exchange data and commands with each other.

The processing circuit 470 may be realized by a combination of a CPU 430, and memory 440 storing a device ID 441 and computer program 442. The CPU 430 controls the operations of the device 101. The CPU 430 can execute a command group described in the computer program 442 loaded to the memory 440, and realize various types of functions. A command group to realize the later-described actions of the device 101 is written in the computer program 442. The above-described computer program 442 may be stored in the memory 440 of the device 101 beforehand, as a product. Alternatively, the computer program 442 may be recorded on a recording medium such as a CD-ROM and distributed through the market, or may be transmitted over electric communication lines such as the Internet, and the computer program 442 acquired by way of the recording medium or electric communication lines may be stored in the memory 440.

Alternatively, the processing circuit 470 may be realized as dedicated hardware configured to realize the operations described below. Note that the device ID 441 is an identifier uniquely assigned to the device 101. The device ID 441 may be independently assigned by the manufacturer of the device 101, or may be a physical address uniquely assigned on a network (a so-called MAC address) as a principle.

Description has been made regarding FIG. 4 that the device ID 441 is stored in the memory 440 where the computer program 442 is stored. However, this is one example of the configuration of the processing circuit 470. The computer program 442 may be stored in RAM or ROM, and the device ID 441 may be stored in flash memory, for example.

The input/output circuit 410 outputs results processed by the processing circuit 470. The input/output circuit 410 also converts input analog signals into digital data and transmits to the bus 330.

The communication circuit 450 is a circuit for communicating with another device (e.g., the local server 102) via wired communication or wireless communication. The communication circuit 450 performs communication with another device via a network, for example via a wired LAN such as a network conforming to the Ethernet (a registered trademark) standard, although this is not restrictive. The communication circuit 450 transmits log information and ID information generated by the processing circuit 470 to the local server 102. The communication circuit 450 also transmits signals received from the local server 102 to the processing circuit 470 via the bus 460.

The device 101 may include, besides the components that are illustrated, other components for realizing functions required of the device 101.

Figure 5:
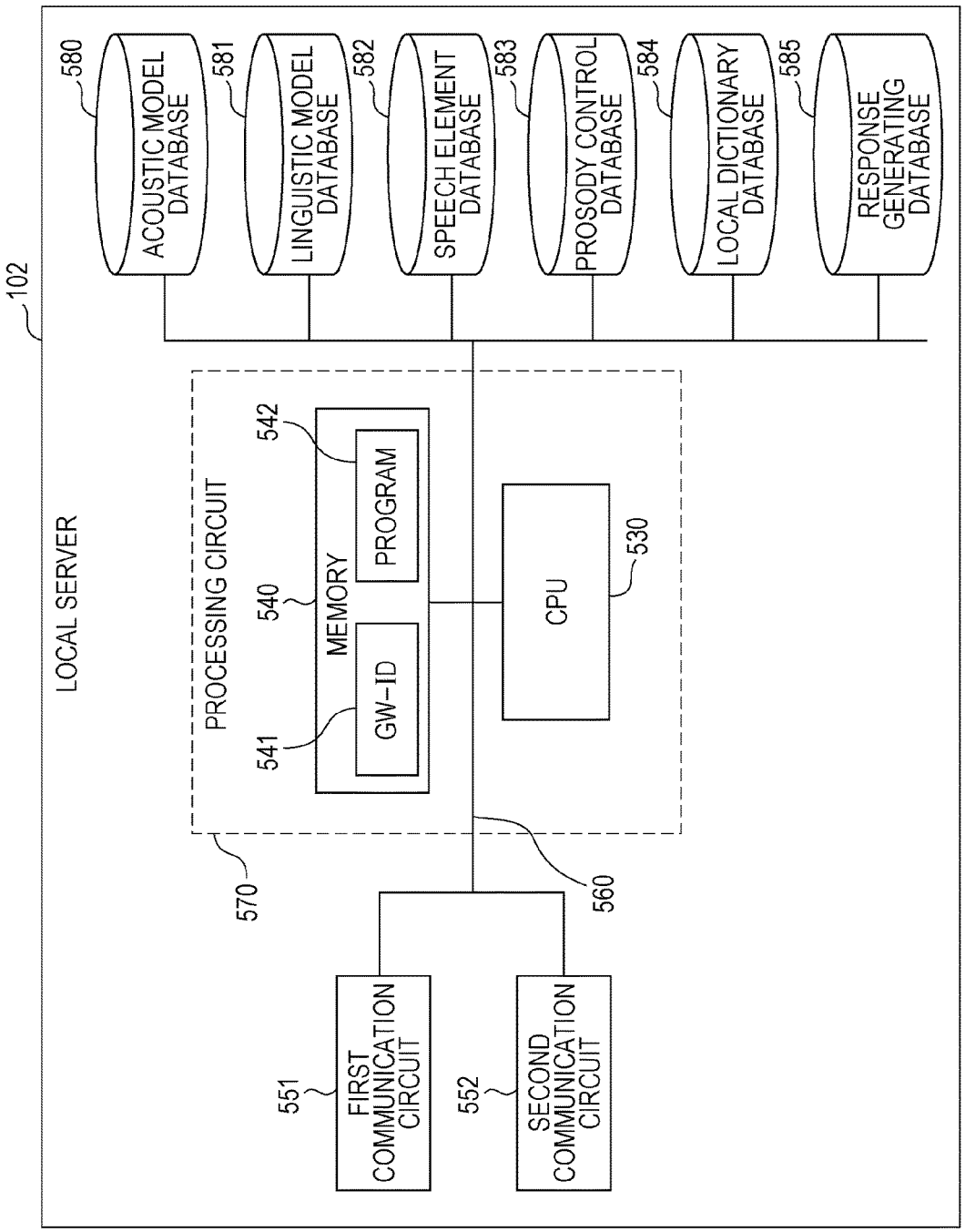
FIG. 5 is a diagram illustrating an example of the hardware configuration of a local server according to the embodiment.

FIG. 5 is a diagram illustrating an example of the hardware configuration of the local server 102. The local server 102 serves as a gateway between the voice input/output device 240, device 101, and information communication network 220. The local server 102 includes a first communication circuit 551, a second communication circuit 552, a processing circuit 570, an acoustic model database 580, a linguistic model database 581, a speech element database 582, a prosody control database 583, a local dictionary database 584, and a response generating database 585, as components, as illustrated in FIG. 5. These components are connected to each other by a bus 560, and can exchange data and commands with each other.

The processing circuit 570 is connected to the acoustic model database 580, linguistic model database 581, speech element database 582, prosody control database 583, local dictionary database 584, and response generating database 585, and can acquire and edit management information stored in the databases. Note that while the acoustic model database 580, linguistic model database 581, speech element database 582, prosody control database 583, local dictionary database 584, and response generating database 585, are components within the local server 102 in the present embodiment, these may be provided outside of the local server 102. In this case, a communication line such as an Internet line, wired or wireless LAN, or the like, may be included in the connection arrangement between the databases and the components of the local server 102, in addition to the bus 560.

The first communication circuit 551 is a circuit for communicating with other devices (e.g., the voice input/output device 240 and device 101) via wired communication or wireless communication. The first communication circuit 551 communicates with other devices via a network in the present embodiment, such as communication via a wired LAN such as a network conforming to the Ethernet (a registered trademark) standard or the like, for example, although this is not restrictive. The first communication circuit 551 transmits log information and ID information generated by the processing circuit 570 to the voice input/output device 240 and device 101. The first communication circuit 551 also transmits signals received from the voice input/output device 240 and device 101 to the processing circuit 570 via the bus 560.

The second communication circuit 552 is a circuit that communicates with the cloud server 111 via wired communication or wireless communication. The second communication circuit 552 connects to a communication network via wired communication or wireless communication, and further communicates with the cloud server 111, via a communication network. The communication network in the present embodiment is the information communication network 220. The second communication circuit 552 performs communication via a wired LAN such as a network conforming to the Ethernet (a registered trademark) standard, for example. The second communication circuit 552 exchanges various types of information with the cloud server 111.

The processing circuit 570 may be realized by a combination of a CPU 530, and memory 540 storing a uniquely-identifiable gateway ID (hereinafter also referred to as GW-ID) 541 and computer program 542. The CPU 530 controls the operations of the local server 102, and also may control the operations of the voice input/output device 240 and device 101. The gateway ID 541 is an identifier uniquely given to the local server 102. The gateway ID 541 may be independently assigned by the manufacturer of the local server 102, or may be a physical address uniquely assigned on a network (a so-called MAC address) as a principle. The CPU 530 can execute a command group described in the computer program 542 loaded to the memory 540, and realize various types of functions. A command group to realize the operations of the local server 102 is written in the computer program 542. The above-described computer program 542 may be stored in the memory 540 of the local server 102 beforehand, as a product. Alternatively, the computer program 542 may be recorded on a recording medium such as a CD-ROM and distributed through the market as a product, or may be transmitted over electric communication lines such as the Internet, and the computer program 542 acquired by way of the recording medium or electric communication lines may be stored in the memory 540.

Alternatively, the processing circuit 570 may be realized as dedicated hardware configured to realize the operations described below. The local server 102 may include other components besides those illustrated, to realize functions required of the local server 102.

Description has been made regarding FIG. 5 that the gateway ID 541 is stored in the memory 540 where the computer program 542 is stored. However, this is one example of the configuration of the processing circuit 570. The computer program 542 may be stored in RAM or ROM, and the gateway ID 541 may be stored in flash memory, for example.

The acoustic model database 580 has registered therein various acoustic models including frequency patterns such as voice waveforms and the like, and text strings corresponding to speech, and so forth. The linguistic model database 581 has registered therein various types of linguistic models including words, order of words, and so forth. The speech element database 582 has registered therein various types of speech elements in increments of phonemes or the like, and expressing features of phonemes. The prosody control database 583 has registered therein various types of information to control prosodies of text strings. The local dictionary database 584 has registered therein various types of text strings, and semantic tags corresponding to each of the text strings in a correlated manner. Text strings are made up of words, phrases, and so forth. A semantic tag indicates a logical expression representing the meaning of a certain text string. In a case where there are multiple text strings of which the meanings are the same, for example, the same semantic tag is set in common to the multiple text strings. For example, a semantic tag represents the name of a task object, the task content of a task object, and so forth, by a keyword. FIG. 11 illustrates an example of combinations of text strings and semantic tags corresponding to the text strings. The response generating database 585 has registered therein various types of semantic tags, and control commands of the device 101 corresponding to the various types of semantic tags, in a correlated manner. The response generating database 585 has registered therein text strings, i.e., text information, of response messages corresponding to control commands and so forth, correlated with the semantic tags and control commands, for example.

Figure 6:
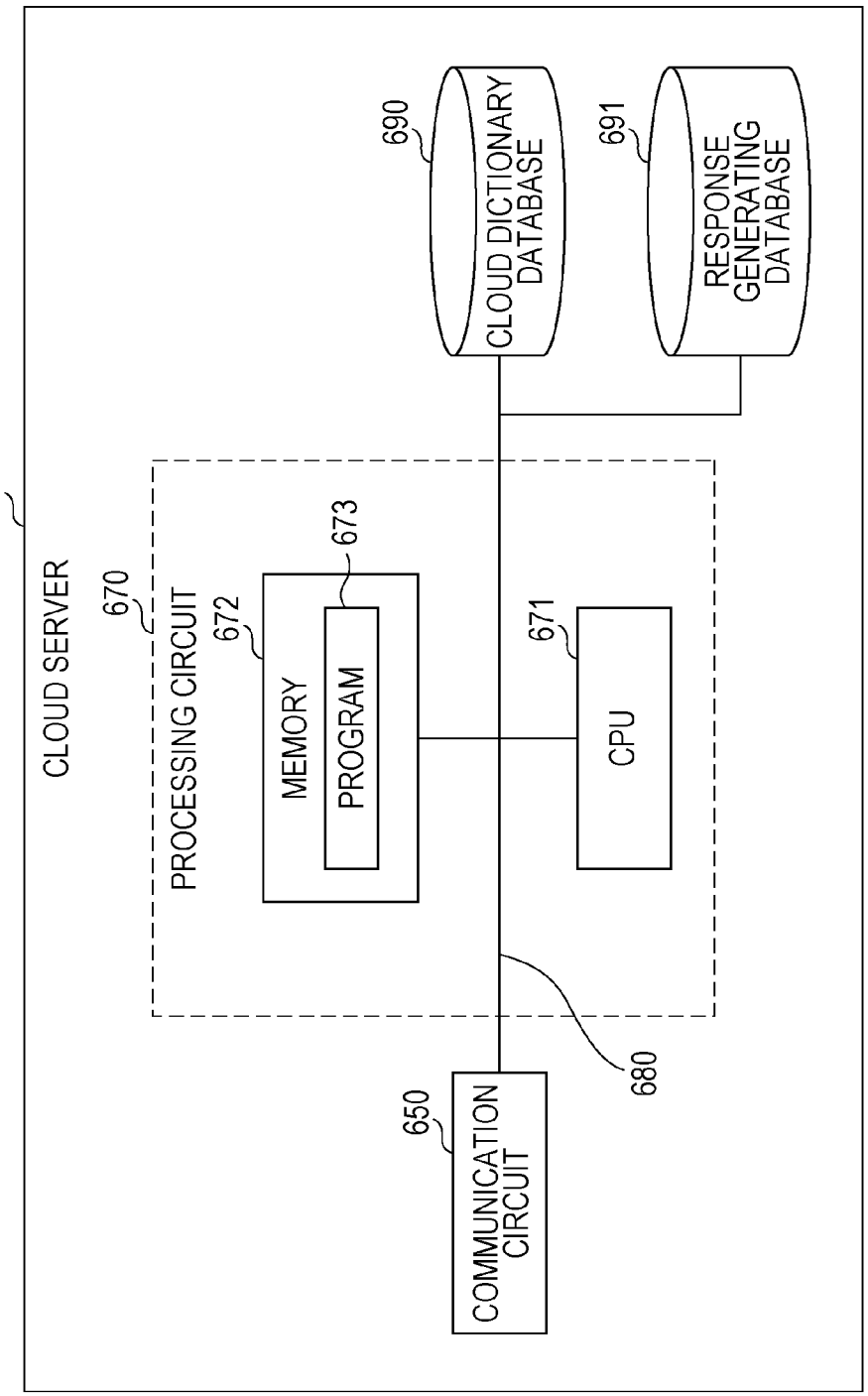
FIG. 6 is a diagram illustrating an example of the hardware configuration of a cloud server according to the embodiment.

FIG. 6 illustrates an example of the hardware configuration of the cloud server 111. The cloud server 111 includes a communication circuit 650, a processing circuit 670, a cloud dictionary database 690, and a response generating database 691, as components thereof, as illustrated in FIG. 6. These components are connected to each other by a bus 680, and can exchange data and commands with each other.

The processing circuit 670 has a CPU 671, and memory 672 storing a program 673. The CPU 671 controls the operations of the cloud server 111. The above-described CPU 671 executes a command group described in the computer program 673 loaded to the memory 672. Thus, the CPU 671 can realize various functions. A command group to realize the later-described operations of the cloud server 111 is written in the computer program 673. The above-described computer program 673 may be recorded on a recording medium such as a CD-ROM and distributed through the market as a product, or may be transmitted over electric communication lines such as the Internet. A device having the hardware illustrated in FIG. 6 (e.g., a PC) can function as the cloud server 111 according to the present embodiment by reading in this computer program 673.

The processing circuit 670 is connected to the cloud dictionary database 690 and response generating database 691, and can acquire and edit management information stored in the databases. Note that while the cloud dictionary database 690 and response generating database 691 are components within the cloud server 111 in the present embodiment, these may be provided outside of the cloud server 111. In this case, a communication line such as an Internet line, wired or wireless LAN, or the like, may be included in the connection arrangement between the databases and the components of the cloud server 111, in addition to the bus 680.

The communication circuit 650 is a circuit for communicating with other devices (e.g., the local server 102) via wired communication or wireless communication. The communication circuit 650 connects to a communication network via wired communication or wireless communication, and further communicates with other devices (e.g., the local server 102) via the communication network. The communication network in the present embodiment is the information communication network 220. The communication circuit 650 performs communication via a wired LAN such as a network conforming to the Ethernet (a registered trademark) standard, for example.

The cloud dictionary database 690 has registered therein various types of text strings, and semantic tags corresponding to each of the text strings, in the same way as the local dictionary database 584. Text strings are made up of words, phrases, and so forth. The cloud dictionary database 690 has registered therein a far greater number of combinations of text strings and semantic tags than the local dictionary database 584. The cloud dictionary database 690 further has registered therein local correlation information, which is information regarding whether or not a text string is registered in the local dictionary database 584. In a case where there are multiple local servers 102. The cloud dictionary database 690 may register local correlation information corresponding to the gateway IDs of the respective local servers 102. For example, FIG. 11 illustrates an example of combinations of text strings, semantic tags corresponding to the text strings, and local correlation information corresponding to the text strings. The response generating database 691 has the same configuration as the response generating database 585 of the local server 102.

Figure 7:
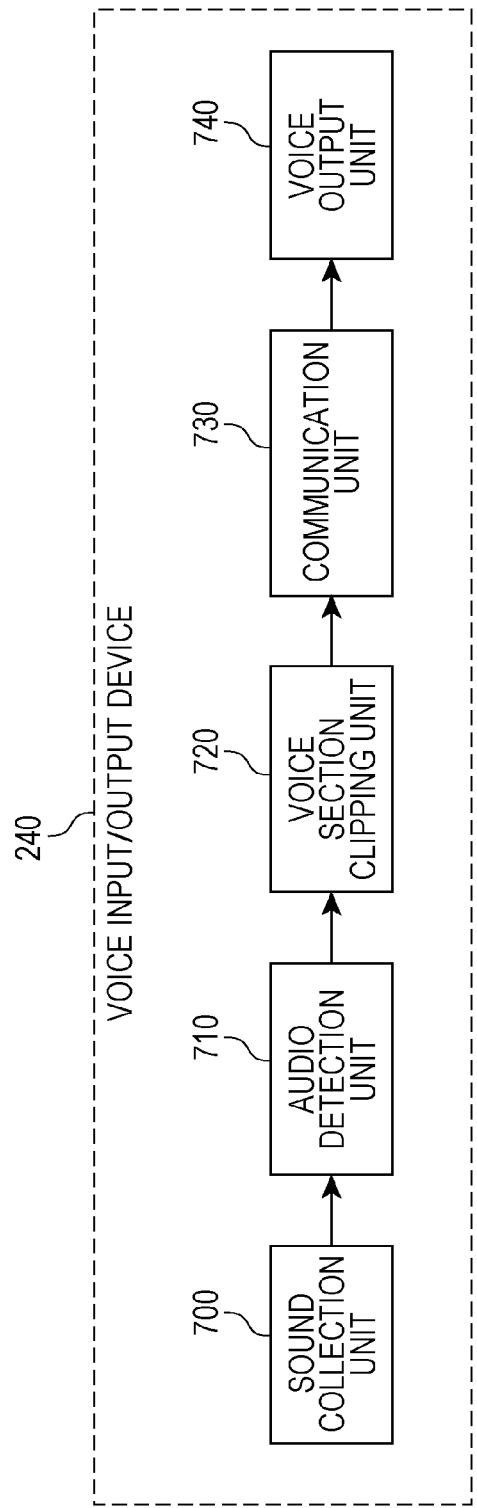
FIG. 7 is a diagram illustrating an example of the system configuration of a voice input/output device according to the embodiment.

The voice input/output device 240, device 101, local server 102, and cloud server 111 will be described from the perspective of system configuration. FIG. 7 is a block diagram illustrating an example of the system configuration of the voice input/output device 240. The voice input/output device 240 includes a sound collection unit 700, an audio detection unit 710, a voice section clipping unit 720, a communication unit 730, and a voice output unit 740, as illustrated in FIG. 7.

The sound collection unit 700 corresponds to the sound collection circuit 301 in FIG. 3. The sound collection unit 700 collects sound from the user and generates analog audio signals, and also converts the generated analog audio signals into digital data and generates audio signals from the converted digital data.

The audio detection unit 710 and the voice section clipping unit 720 are realized by the processing circuit 300 in FIG. 3. The CPU 310 which has executed the computer program 342 functions at one point as the audio detection unit 710 for example, and at another point functions as the voice section clipping unit 720. Note that at least one of these two components may be realized by hardware performing dedicated processing, such as a digital signal processor (DSP) or the like.

The audio detection unit 710 determines whether or not audio has been detected. For example, in a case where the level of detected audio is at or below a predetermined level, the audio detection unit 710 determines that audio has not been detected. The voice section clipping unit 720 extracts a section from the acquired audio signals where there is voice. This section is, for example, a time section.

The communication unit 730 corresponds to the communication circuit 303 in FIG. 3. The communication unit 730 performs communication with another device other than the voice input/output device 240 (e.g., the local server 102), via wired communication or wireless communication such as a network. The communication unit 730 performs communication via wired LAN such as a network conforming to the Ethernet (a registered trademark) standard, for example. The communication unit 730 transmits voice signals of the section which the voice section clipping unit 720 has extracted to another device. The communication unit 730 also hands voice signals received from another device to the voice output unit 740.

The voice output unit 740 corresponds to the voice output circuit 302 in FIG. 3. The voice output unit 740 converts the voice signals which the communication unit 730 has received into analog voice signals, and outputs the analog voice signals.

Figure 8:
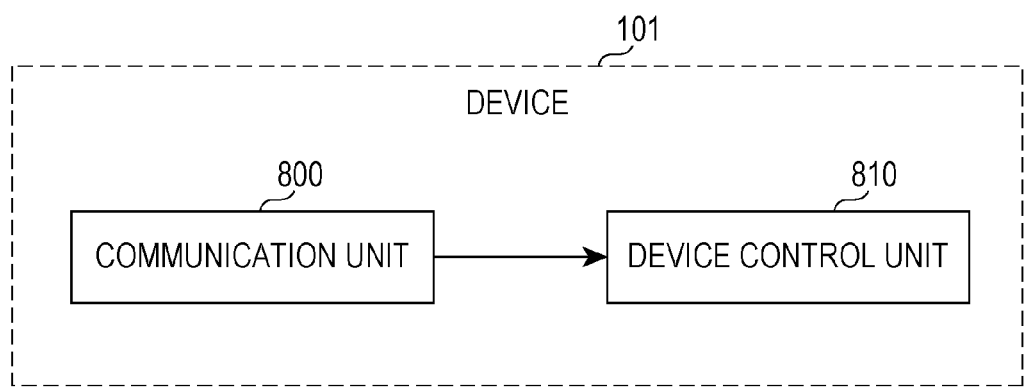
FIG. 8 is a diagram illustrating an example of the system configuration of a device according to the embodiment.

FIG. 8 is a block diagram illustrating an example of the system configuration of the device 101. The device 101 includes a communication unit 800 and a device control unit 810, as illustrated in FIG. 8.

The communication unit 800 corresponds to the communication circuit 450 in FIG. 4. The communication circuit 800 communicates with another device other than the device 101 (e.g., the local server 102) via wired communication or wireless communication, such as a network. The communication circuit 800 performs communication via a wired LAN such as a network conforming to the Ethernet (a registered trademark) standard, for example.

The device control unit 810 corresponds to the input/output circuit 410 and processing circuit 470 in FIG. 4. The device control unit 810 reads in control data that the communication unit 800 has received, and controls the operations of the device 101. The device control unit 810 also controls output of processing results of having controlled the operations of the device 101. For example, the device control unit 810 reads in and processes control data that the communication unit 800 has received, by the processing circuit 470, performs input/output control of the input/output circuit 410, and so forth.

Figure 9:
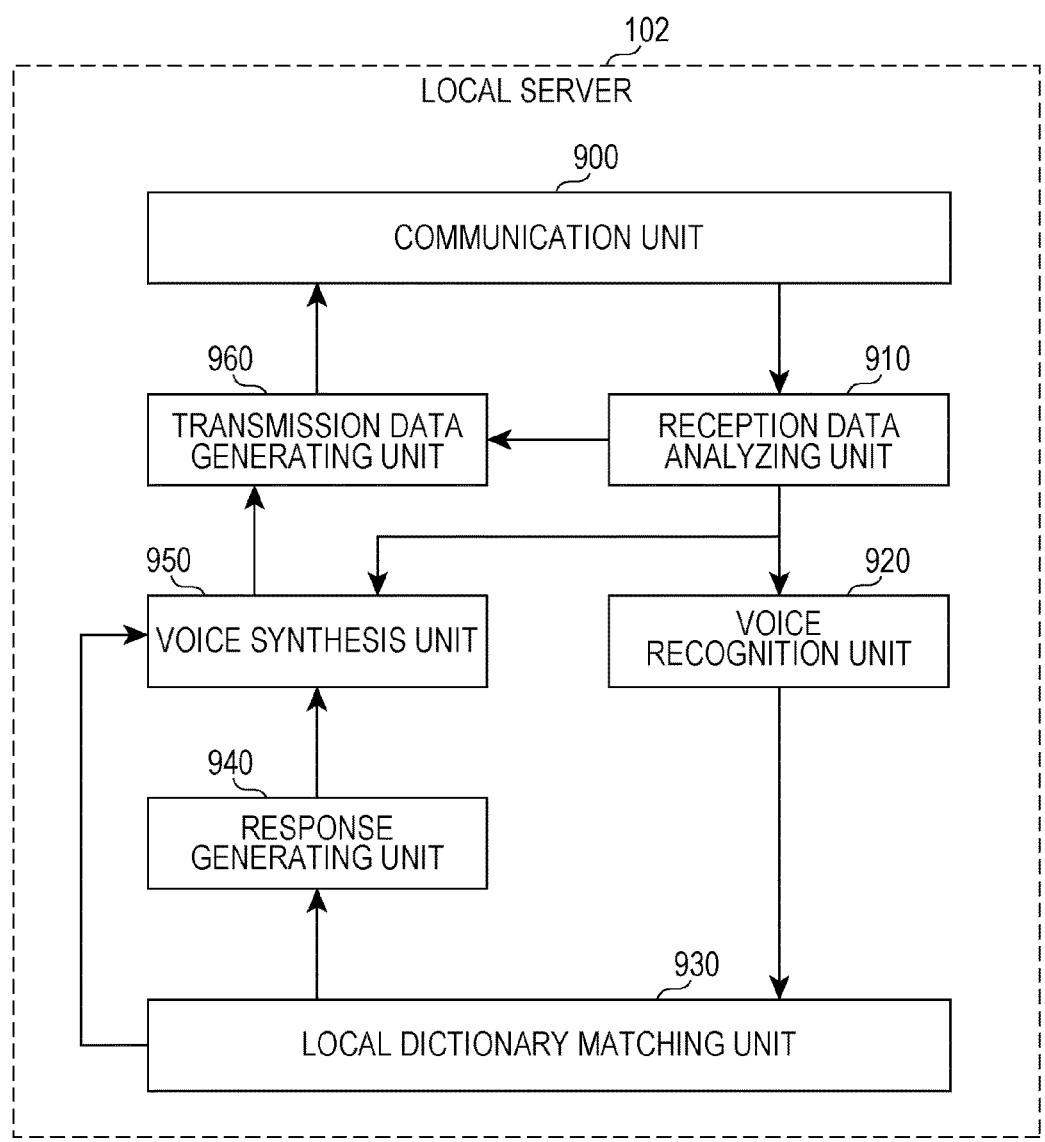
FIG. 9 is a diagram illustrating an example of the system configuration of a local server according to the embodiment.

FIG. 9 is a block diagram illustrating an example of the system configuration of the local server 102. The local server 102 includes a communication unit 900, a reception data analyzing unit 910, a voice recognition unit 920, a local dictionary matching unit 930, a response generating unit 940, a voice synthesis unit 950, and a transmission data generating unit 960, as illustrated in FIG. 9.

The communication unit 900 corresponds to the first communication circuit 551 and second communication circuit 552 in FIG. 5. The communication unit 900 communicates with devices other than the local server 102 (e.g., the voice input/output device 240 and device 101) via wired communication or wireless communication, such as a network. The communication unit 900 connects to a communication network such as the information communication network 220 or the like via wired communication or wireless communication, and further communicates with the cloud server 111 via the communication network. The communication unit 900 performs communication via a wired LAN such as a network conforming to the Ethernet (a registered trademark) standard, for example. The communication unit 900 hands data received from other devices and the cloud server 111 and so forth to the reception data analyzing unit 910. The communication unit 900 transmits data generated by the transmission data generating unit 960 to other devices, the cloud server 111, and so forth.

The reception data analyzing unit 910 corresponds to the processing circuit 570 in FIG. 5. The reception data analyzing unit 910 analyzes the type of data that the communication unit 900 has received. The reception data analyzing unit 910 also judges, as the result of having analyzed the type of received data, whether to perform further processing internally in the local server 102, or to transmit the data to another device. In a case of the former, the reception data analyzing unit 910 hands the received data to the voice recognition unit 920 and so forth. In a case of the latter, the reception data analyzing unit 910 decides a combination of the device to transmit to next, and data to be transmitted to that device.

The voice recognition unit 920 is realized by the processing circuit 570, the acoustic model database 580, and the linguistic model database 581, illustrated in FIG. 5. The voice recognition unit 920 converts voice signals into text string data. More specifically, the voice recognition unit 920 acquires, from the acoustic model database 580, information of an acoustic model registered beforehand, and converts the voice data into phonemic data using the acoustic model and frequency characteristics of the voice data. The voice recognition unit 920 further acquires information regarding a linguistic model from the linguistic model database 581 that has been registered beforehand, and converts the phonemic data into particular text string data based on the linguistic mode and the array of the phonemic data. The voice recognition unit 920 hands the converted text string data to the local dictionary matching unit 930.

The local dictionary matching unit 930 is realized by the processing circuit 570 and the local dictionary database 584 in FIG. 5. The local dictionary matching unit 930 converts the text string data into semantic tags. A semantic tag specifically is a keyword indicating a device that is the object of control, a task content, and so forth. The local dictionary matching unit 930 matches the received text string data and the local dictionary database 584, and extracts a semantic tag that agrees with the relevant text string data. The local dictionary database 584 stores text strings such as words and so forth, and semantic tags corresponding to the text strings, in a correlated manner. Searching within the local dictionary database 584 for a text string that agrees with the received text string extracts a semantic tag that agrees with, i.e., matches, the received text string.

The response generating unit 940 is realized by the processing circuit 570 and the response generating database 585 in FIG. 5. The response generating unit 940 matches semantic tags received from the local dictionary matching unit 930 with the response generating database 585, and generates control signals to control the device 101 that is the object of control, based on control commands corresponding to the semantic tags. Further, the response generating unit 940 generates text string data of text information to be provided to the user 5100, based on the matching results.

The voice synthesis unit 950 is realized by the processing circuit 570, speech element database 582, and prosody control database 583 in FIG. 5. The voice synthesis unit 950 converts text string data into voice signals. Specifically, the voice synthesis unit 950 acquires information of a speech element model and prosody control model that have been registered beforehand, from the speech element database 582 and prosody control database 583, and converts the text string data into particular voice signals, based on the speech element model, prosody control model, and text string data.

The transmission data generating unit 960 corresponds to the processing circuit 570 in FIG. 5. The transmission data generating unit 960 generates transmission data from the combination of the device to transmit to next and data to be transmitted to that device, that the reception data analyzing unit 910 has decided.

Figure 10:
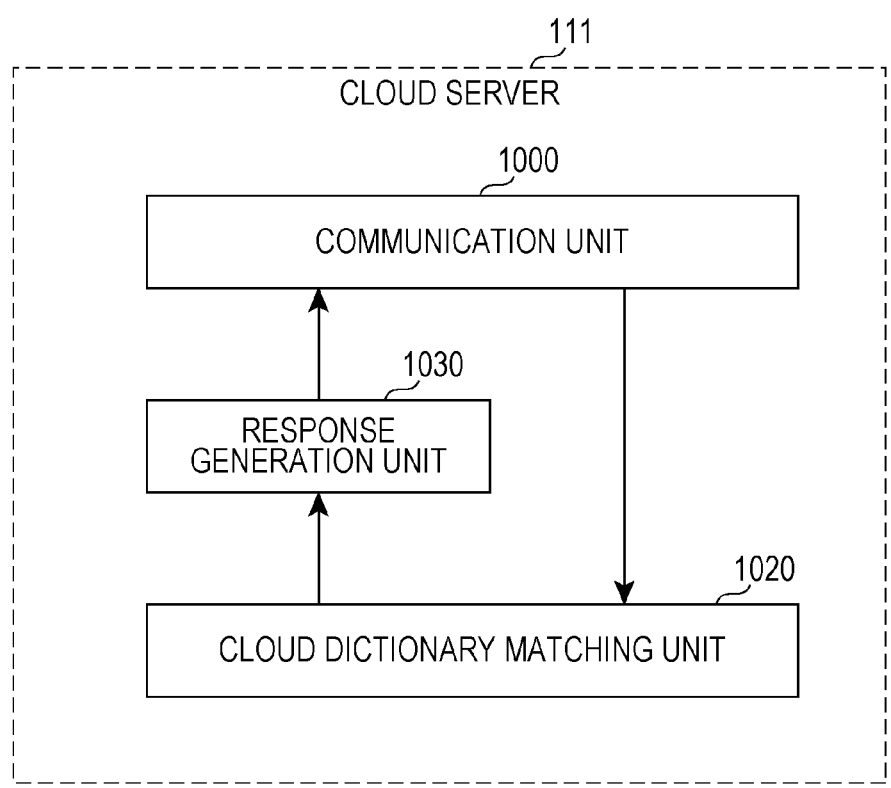
FIG. 10 is a diagram illustrating an example of the system configuration of a cloud server according to the embodiment.

FIG. 10 is a block diagram illustrating an example of the system configuration of the cloud server 111. The cloud server 111 includes a communication unit 1000, a cloud dictionary matching unit 1020, and a response generating unit 1030, as illustrated in FIG. 10.

The communication unit 1000 corresponds to the communication circuit 650 in FIG. 6. The communication unit 1000 connects to a communication network such as the information communication network 220 or the like via wired communication or wireless communication, such as a network, and further communicates with another device (e.g., the local server 102) via the communication network. The communication unit 1000 performs communication via a wired LAN such as a network conforming to the Ethernet (a registered trademark) standard, for example.

The cloud dictionary matching unit 1020 is realized by the processing circuit 670 and cloud dictionary database 690 in FIG. 6. The cloud dictionary matching unit 1020 converts text string data into semantic tags, and further checks whether a synonym for the text string is registered in the local dictionary database 584. A synonym for the text string is a text string that has a common semantic tag. Specifically, the cloud dictionary matching unit 1020 matches the received text string data with the cloud dictionary database 690, thereby extracting a semantic tag that agrees with, i.e., matches, the received text string. The cloud dictionary matching unit 1020 also matches the cloud dictionary database 690 with the extracted semantic tag, thereby extracting other text strings given the same semantic tag. The cloud dictionary matching unit 1020 further outputs the extracted text strings that are also registered in the local dictionary database 584, and hands these text strings data and the semantic tag corresponding to, i.e., matching the text strings data, to the response generating unit 1030.

The response generating unit 1030 is realized by the processing circuit 670 and response generating database 691 in FIG. 6. The response generating unit 1030 matches the received semantic tag with the response generating database 691, and generates control signals to control the device 101 that is the object of control, based on a control command corresponding to the semantic tag. Further, the response generating unit 1030 generates text string data of text information to be provided to the user 5100, based on the results of matching.

FIG. 11 is a diagram illustrating a specific example of the cloud dictionary database 690. The cloud dictionary database 690 stores text strings such as words and the like, semantic tags, and local correlation information, in a mutually associated manner. The local correlation information is the information under "LOCAL DICTIONARY DATABASE REGISTRATION STATUS" in FIG. 11. This is information that indicates whether or not a text string has been registered in the local dictionary database 584, for each combination of text string and semantic tag. Note that text strings and semantic tags are stored in the local dictionary database 584, in a mutually associated manner.

[Operations of Spoken Dialog Agent System]

Figure 12:
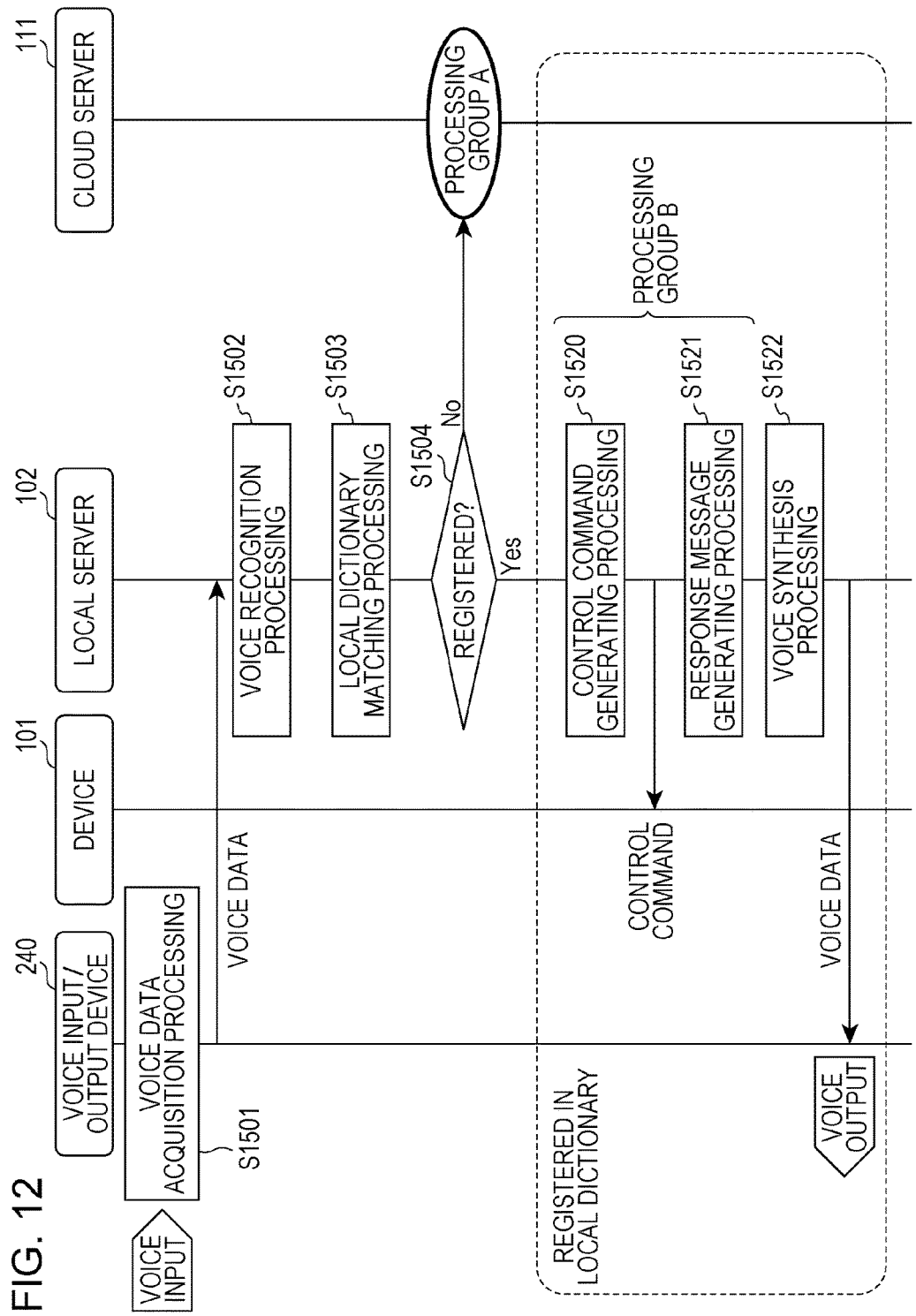
FIG. 12 is a sequence diagram of communication processing for recommending speech content, by a spoken dialog agent system according to the embodiment.
Figure 13:
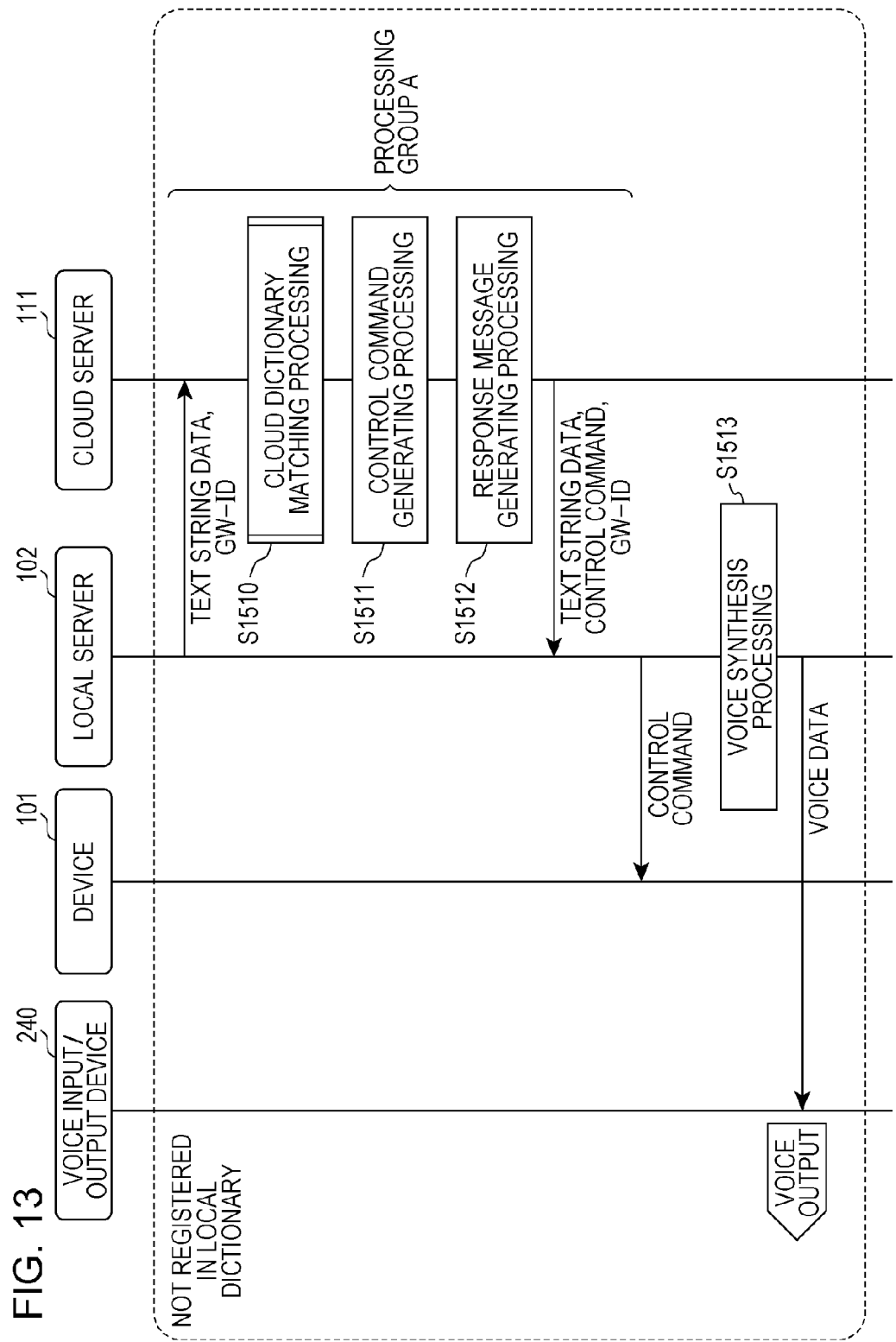
FIG. 13 is a sequence diagram of communication processing for recommending speech content, by a spoken dialog agent system according to the embodiment.

Next, the flow of processing where a speech phrase to which the terminal side, i.e., local server 102, can speedily respond, is recommended, will be described regarding operations of the spoken dialog agent system 1. FIGS. 12 and 13 illustrate a sequence of processing by the spoken dialog agent system 1, of recommending a speech phrase to which the local side can speedily respond to. This sequence is started when the user 5100 starts some sort of instruction to the voice input/output device 240 by voice.

Upon the user 5100 inputting an instruction to the voice input/output device 240 by voice, the voice input/output device 240 acquires voice data of the user 5100 in step S1501. The communication circuit 303 of the voice input/output device 240 transmits the acquired voice data to the local server 102. The local server 102 receives the data.

Next, in step S1502, the local server 102 receives the voice data from the voice input/output device 240, and performs speech recognition processing of the voice data. Speech recognition processing is processing for the voice recognition unit 920 that the local server 102 has to recognize the speech of the user. Specifically, the local server 102 has the information of the acoustic model and linguistic model registered in the acoustic model database 580 and linguistic model database 581. When the user 5100 inputs voice to the voice input/output device 240, the CPU 530 of the local server 102 extracts frequency characteristics from the voice of the user 5100, and extracts phonemic data corresponding to the extracted frequency characteristics from the acoustic model held in the acoustic model database 580. Next, the CPU 530 matches the array of extracted phonemic data to the closest text string data in the linguistic model held in the linguistic model database 581, thereby converting the phonemic data into text string data. As a result, the voice data is converted into text string data.

Next, in step S1503, the local server 102 performs local dictionary matching processing of the text string data. Local dictionary matching processing is processing where the local dictionary matching unit 930 that the local server 102 has converts the text string data into a semantic tag. Specifically, the local server 102 stores information of dictionaries registered in the local dictionary database 584. The CPU 530 of the local server 102 matches the text string data converted in step S1502 and the local dictionary database 584, and outputs a semantic tag corresponding to the text string data. In a case where the text string data is not registered in the local dictionary database 584, the CPU 530 does not convert the text string data into a semantic tag.

In the following step S1504, the local server 102 determines whether or not data that agrees with the text string data is registered in the local dictionary database 584. In a case where such data is registered therein (Yes in step S1504), the local dictionary matching unit 930 of the local server 102 outputs a particular semantic tag corresponding to the text string data, and advances to step S1520 in processing group B. This processing group B is processing performed in a case where the text string data converted from voice data is registered in the local dictionary database 584, and includes the processing of steps S1520 and S1521, which will be described later. On the other hand, in a case where no such data is registered therein (No in step S1504), the local dictionary matching unit 930 of the local server 102 outputs an error representing that there is no semantic tag corresponding to the text string data. The local server 102 transmits a combination of the text string data and the gateway ID to the cloud server 111, and advances to step S1510 in processing group A. This processing group A is processing performed in a case where the text string data converted from voice data is not registered in the local dictionary database 584, and includes the processing of steps S1510 through S1512, which will be described later.

In step S1520 of the processing group B, the local server 102 performs control command generating processing. Control command generating processing is process of generating control commands from semantic tags by the response generating unit 940 that the local server 102 has. Specifically, the local server 102 stores information of control commands registered in the response generating database 585. The CPU 530 of the local server 102 matches the semantic tag converted in step S1503 with the response generating database 585, outputs a control command corresponding to the semantic tag, and transmits this to the relevant device 101.

Next, in step S1521 the local server 102 performs response message generating processing. Response message generating processing is processing of generating a response message by the response generating unit 940 that the local server 102 has. Specifically, the local server 102 stores information of response messages registered in the response generating database 585. The CPU 530 of the local server 102 matches the semantic tag converted in step S1503 and the response generating database 585, and outputs a response message corresponding to the semantic tag, such as a response message corresponding to the control command. For example, in a case where the semantic tag is the "heater_on" shown in FIG. 11, the CPU 530 outputs a response message "I'll turn the heater on" that is stored in the response generating database 585.

In step S1522, the local server 102 further performs voice synthesis. Voice synthesis processing is processing where the voice synthesis unit 950 that the local server 102 has converts the response message into voice data. Specifically, the local server 102 stores speech element information registered in the speech element database 582, and prosody information registered in the prosody control database 583. The CPU 530 of the local server 102 reads in the speech element information registered in the speech element database 582 and the prosody information registered in the prosody control database 583, and converts the text string data of the response message into particular voice data. The local server 102 then transmits the voice data converted in step S1522 to the voice input/output device 240.

In step S1510 of the processing group A, the cloud server 111 performs cloud dictionary matching processing of the text string data received from the local server 102, as illustrated in FIG. 13. Cloud dictionary matching processing is processing of converting a piece of text string data into a semantic tag by the cloud dictionary matching unit 1020 that the cloud server 111 has. Specifically, the cloud server 111 stores information of dictionaries registered in the cloud dictionary database 690. The CPU 671 of the cloud server 111 matches the text string data converted in step S1502 with the cloud dictionary database 690, and outputs a semantic tag corresponding to this text string data. Not only text string data registered in the local dictionary database 584 but also various types of text string data not registered in the local dictionary database 584 are registered on the cloud dictionary database 690. Details of cloud dictionary matching processing will be described later.

Next, the cloud server 111 performs control command generating processing in step S1511. Control command generating processing is processing of generating a control command from a semantic tag at the response generating unit 1030 that the cloud server 111 has. Specifically, the cloud server 111 stores information of control commands registered in the response generating database 691. The CPU 671 of the cloud server 111 matches the semantic tag converted in step S1510 with the response generating database 691, and outputs a control command corresponding to the semantic tag.

Further, the cloud server 111 performs response message generating processing in step S1512. Response message generating processing is processing of generating a response message from a semantic tag, by the response generating unit 1030 that the cloud server 111 has. Specifically, the cloud server 111 stores response message information registered in the response generating database 691. The CPU 671 of the cloud server 111 matches the semantic tag converted in step S1510 with the response generating database 691, and outputs a response message corresponding to the semantic tag and so forth. The response message generated in step S1512 includes a later-described recommendation message, but may include a message corresponding to a control command generated in step S1521.

The cloud server 111 transmits the control command generated in step S1511 and the response message generated in step S1512 to the relevant local server 102 along with the gateway ID of this local server 102. The local server 102 transmits the received control command to the device 101.

Next, the local server 102 performs voice synthesis processing in step S1513. Voice synthesis processing is processing where the voice synthesis unit 950 that the local server 102 has converts a response message into voice data, and is the same as the processing in step S1522. The CPU 530 of the local server 102 converts the text string data of the response message into particular voice data. The local server 102 transmits the voice data converted in step S1513 to the voice input/output device 240. An arrangement may be made where, in a case that a response message that the local server 102 has received from the cloud server 111 does not contain a message corresponding to the control command, the local server 102 matches the control command with the response generating database 585 and acquires a message corresponding to the control command, and performs voice synthesis processing of the acquired message.

Figure 14:
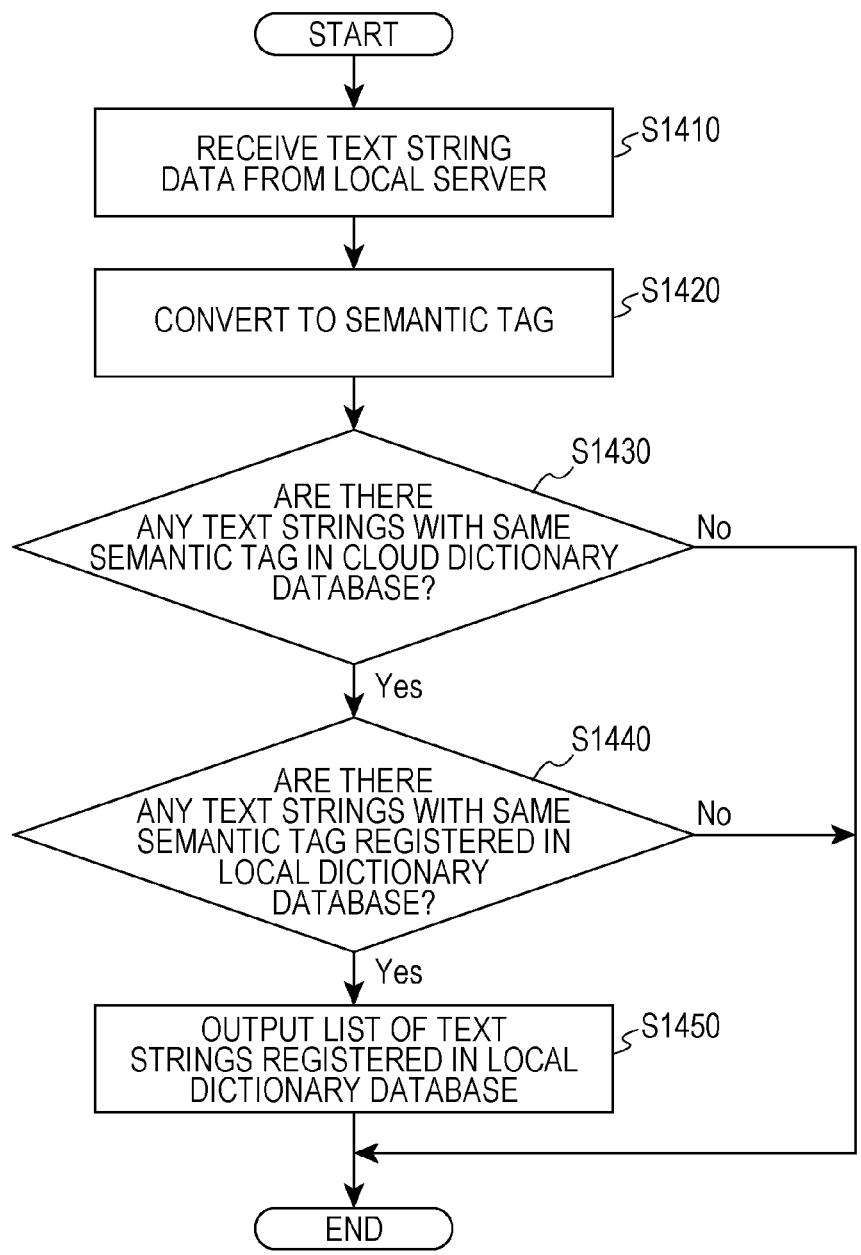
FIG. 14 is a flowchart of cloud dictionary matching processing performed at a cloud server according to the embodiment.
Figure 15:
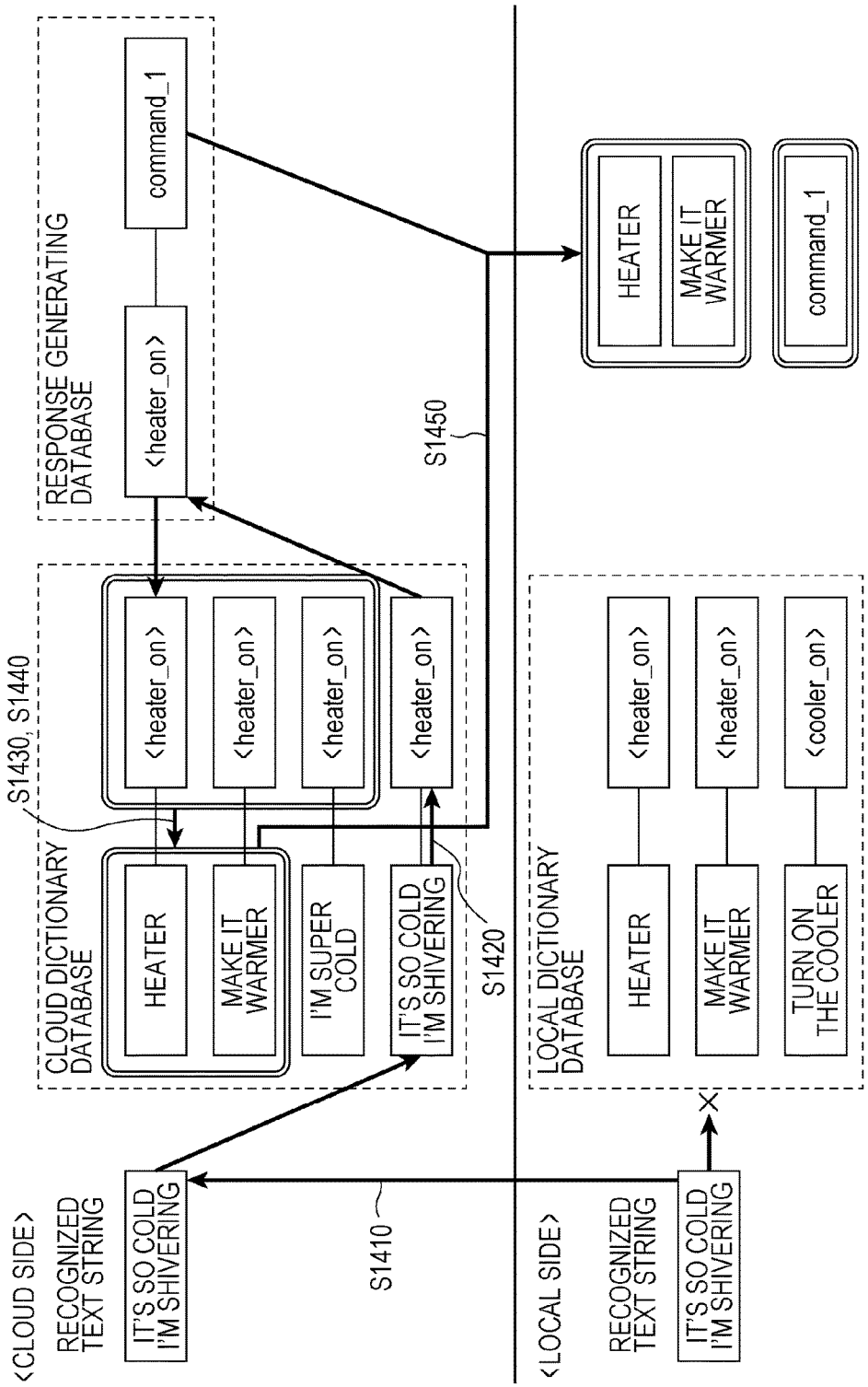
FIG. 15 is a diagram illustrating the flow of various types of information in a spoken dialog agent system according to the embodiment.

Next, the cloud dictionary matching processing in step S1510 will be described in detail with reference to FIGS. 14 and 15. FIG. 14 is a flowchart of the cloud dictionary matching processing in step S1510. FIG. 15 is a diagram illustrating the flow of various types of information in the spoken dialog agent system 1 according to the embodiment.

In step S1410, the cloud server 111 receives text string data from the local server 102.

Next, in step S1420, the cloud server 111 performs processing of converting the text string data into a semantic tag. Specifically, the CPU 671 of the cloud server 111 matches the text string data with the cloud dictionary database 690, and outputs a semantic tag corresponding to the text string data.

The cloud server 111 further determines in step S1430 whether or not other text strings having the same semantic tag as that output in step S1420 are registered in the cloud dictionary database 690. These other text strings are text strings that are different from the text string that the cloud server 111 has received from the local server 102.

In a case where other text strings having the same semantic tag are found to be registered in the cloud dictionary database 690 as a result of the determination in step S1430 (Yes in S1430), in step S1440 the cloud server 111 determines whether or not there is a text string in the other text strings having the same semantic tag that is registered in the local dictionary database 584. On the other hand, in a case where no other text strings having the same semantic tag are found to be registered in the cloud dictionary database 690 (No in S1430), the cloud server 111 performs output of the semantic tag in step S1420, and the cloud dictionary matching processing ends.

In a case where there is found to be a text string in the other text strings having the same semantic tag that is registered in the local dictionary database 584 as a result of the determination in step S1440 (Yes in step S1440), in step S1450 the cloud server 111 outputs a list of text strings registered in the local dictionary database 584, as an object of recommendation. In a case where no other text string is found to be registered (No in step S1440), the cloud server 111 performs output of a semantic tag in step S1420, and the cloud dictionary matching processing ends.

For example, the cloud server 111 receives text string data "It's so cold I'm shivering" in step S1410. As a result of the local dictionary matching processing in step S1503 in FIG. 12, determination is made that this text string data is not registered in the local dictionary database 584 of the local server 102, so this text string data is transmitted to the cloud server 111.

In step S1420, the cloud server 111 matches the text string "It's so cold I'm shivering" with the column "TEXT STRING" that is the text string list in the cloud dictionary database 690 illustrated in FIG. 11. As a result, the cloud server 111 converts the text string "It's so cold I'm shivering" into the corresponding semantic tag <heater_on>. At this time, the cloud server 111 may extract a text string that perfectly agrees with the text string "It's so cold I'm shivering" from the cloud dictionary database 690, may extract a text string that is synonymous with the text string "It's so cold I'm shivering" from the cloud dictionary database 690, or may extract a text string that agrees with part of the text string "It's so cold I'm shivering", such as "shivering" for example, from the cloud dictionary database 690. The cloud server 111 then recognizes the semantic tag corresponding to the extracted text string to be the semantic tag for the text string "It's so cold I'm shivering".

Further, in step S1430, the cloud server 111 determines whether or not there are other text strings registered in the cloud dictionary database 690 to which the semantic tag <heater_on> has been given. Specifically, the cloud server 111 references the column "SEMANTIC TAG" in the cloud dictionary database 690 illustrated in FIG. 11, and determines that the text strings "heater", "Make it warmer", and "I'm super cold" have been given the same semantic tag <heater_on>.

Next, in step S1440, the cloud server 111 determines which of the text strings "heater", "Make it warmer", and "I'm super cold" are registered in the local dictionary database 584. The cloud server 111 checks the column "LOCAL DICTIONARY DATABASE REGISTRATION STATUS" in the cloud dictionary database 690 in FIG. 11, and determines that the text strings "heater" and "Make it warmer" are registered in the local dictionary database 584.

Subsequently, in step S1450, the cloud server 111 outputs the text strings "heater" and "Make it warmer" as objects of recommendation. An object of recommendation is an example of suggested text information. Thus, in the cloud dictionary matching processing, the cloud server 111 outputs a semantic tag corresponding to the text string data received from the local server 102, and outputs a list of text strings that correspond to this semantic tag and are also registered in the local dictionary database 584.

In the response message generating processing in step S1512 in FIG. 13, the cloud server 111 generates a response message including a recommendation message recommending text strings "heater" and/or "Make it warmer" as speech phrases. Specifically, the cloud server 111 generates a recommendation message "Next time, it would be quicker if you say 'heater' or 'Make it warmer'", for example. A recommendation message is an example of suggested text information. The cloud server 111 transmits the generated response message to the local server 102, along with a control command <command_1> corresponding to the semantic tag for "It's so cold I'm shivering" and the gateway ID. The local server 102 converts the received response message "Next time, it would be quicker if you say 'heater' or 'Make it warmer'" into voice data, and transmits this to the voice input/output device 240 in the speech synthesis processing in step S1513.

Thus, in a case where the user has spoken a speech phrase only registered in the cloud-side dictionary, the spoken dialog agent system 1 according to the embodiment makes a recommendation to the user of a speech phase that can perform the same processing and that is registered in the local-side dictionary, thus improving response when the user performs device control. In the embodiment, the recommendation message recommending this speech phrase is generated at the cloud side.

Note that in the embodiment, the cloud server 111 does not need to have the response generating database 691. In this case, the cloud server 111 may output the semantic tag corresponding to the text string received from the local server 102 and the list of text strings registered into the local dictionary database 584 that correspond to this semantic tag, and transmit to the local server 102 in the processing of the processing group A. The local server 102 may match the received semantic tag with the response generating database 585, generate a control command, and generate a response message including a recommendation message from the text string list that has been received.

[First Modification of Spoken Dialog Agent System]

Figure 16:
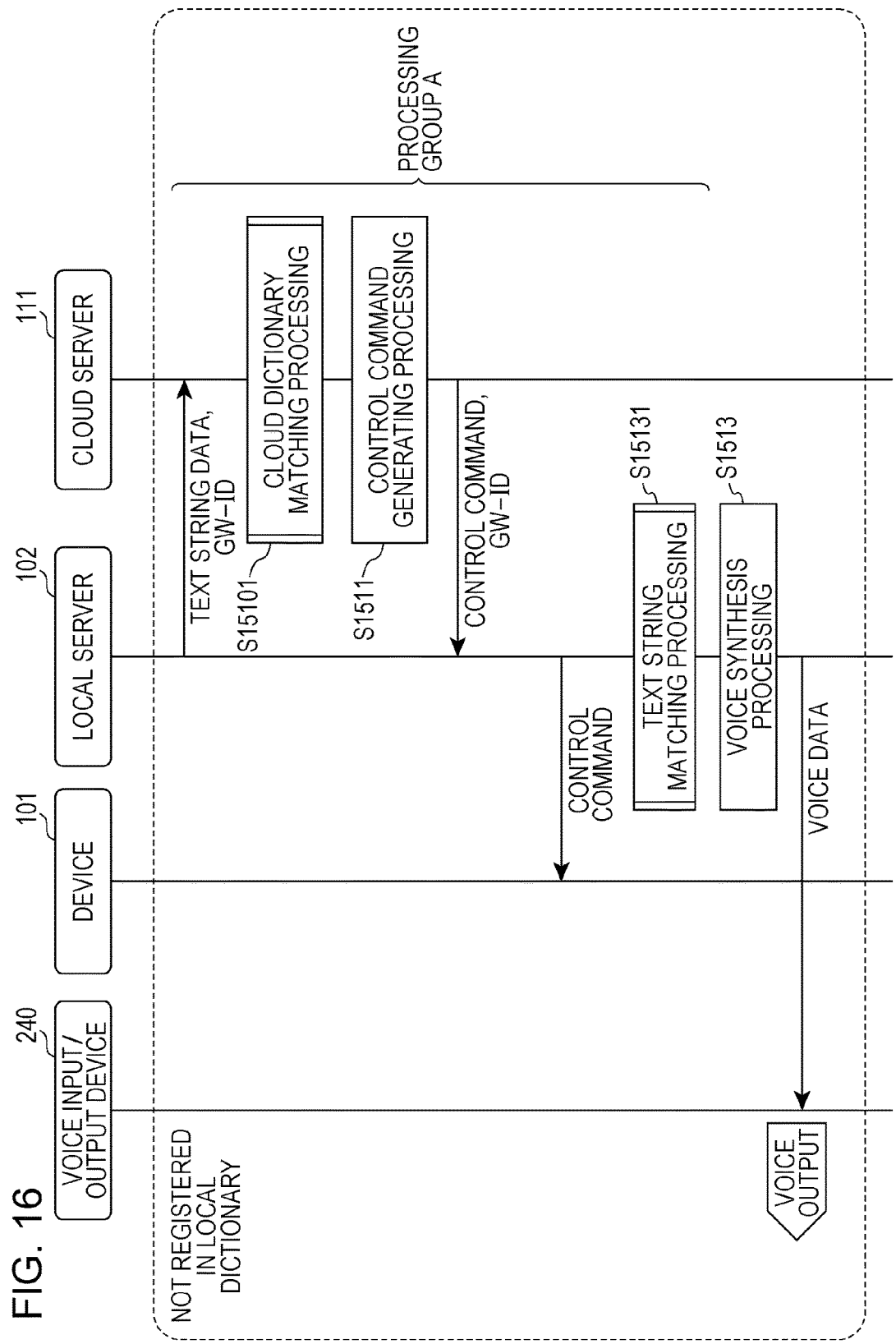
FIG. 16 is a sequence diagram relating to a processing group A, out of communication processing where a spoken dialog agent system according to a first modification recommends speech content.
Figure 17:
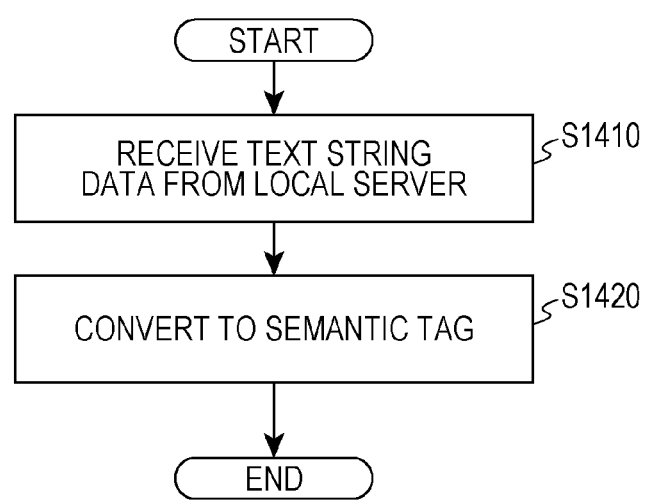
FIG. 17 is a flowchart of cloud dictionary matching processing at a cloud server according to the first modification.
Figure 18:
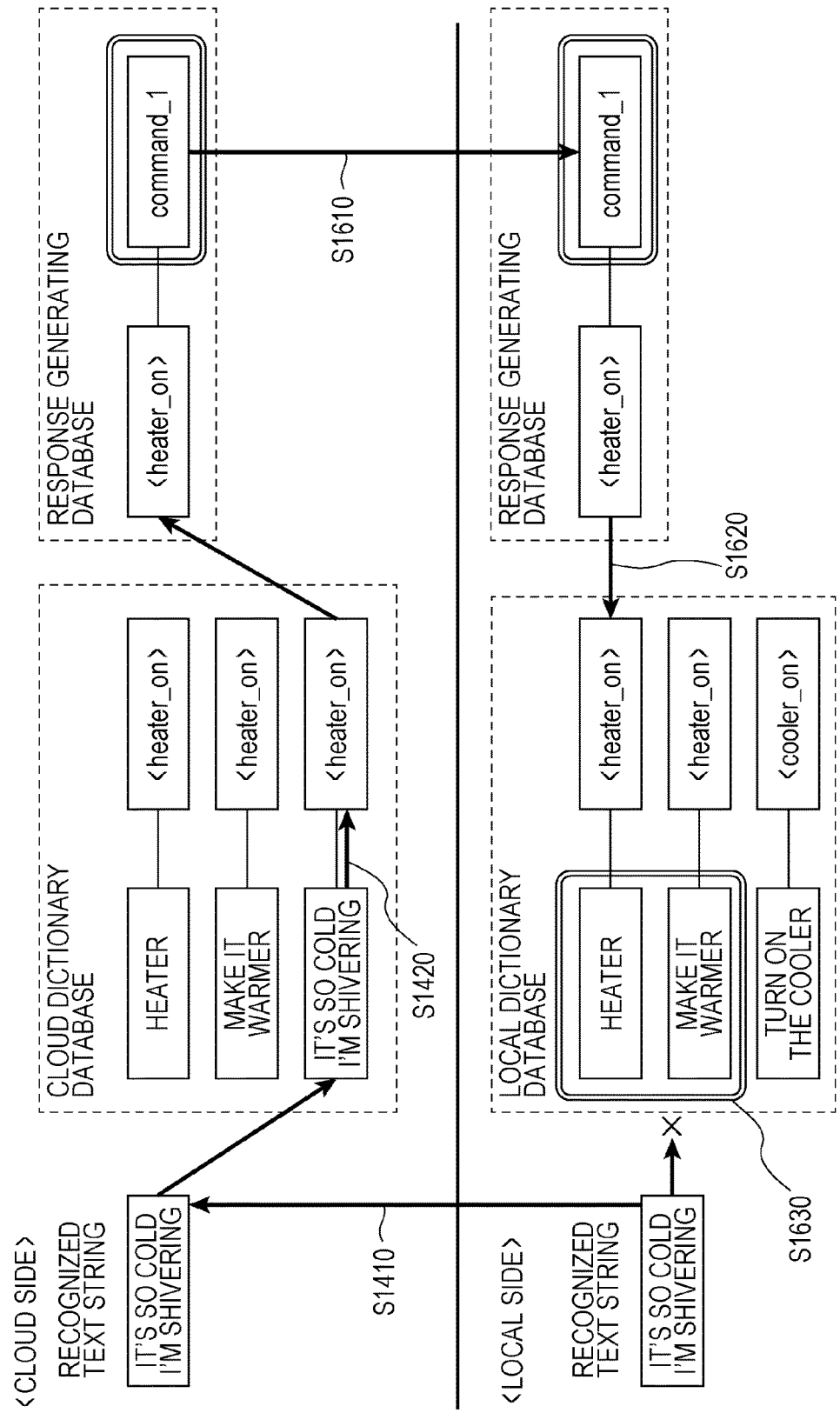
FIG. 18 is a diagram illustrating the flow of various types of information in a spoken dialog agent system according to the first modification.
Figure 19:
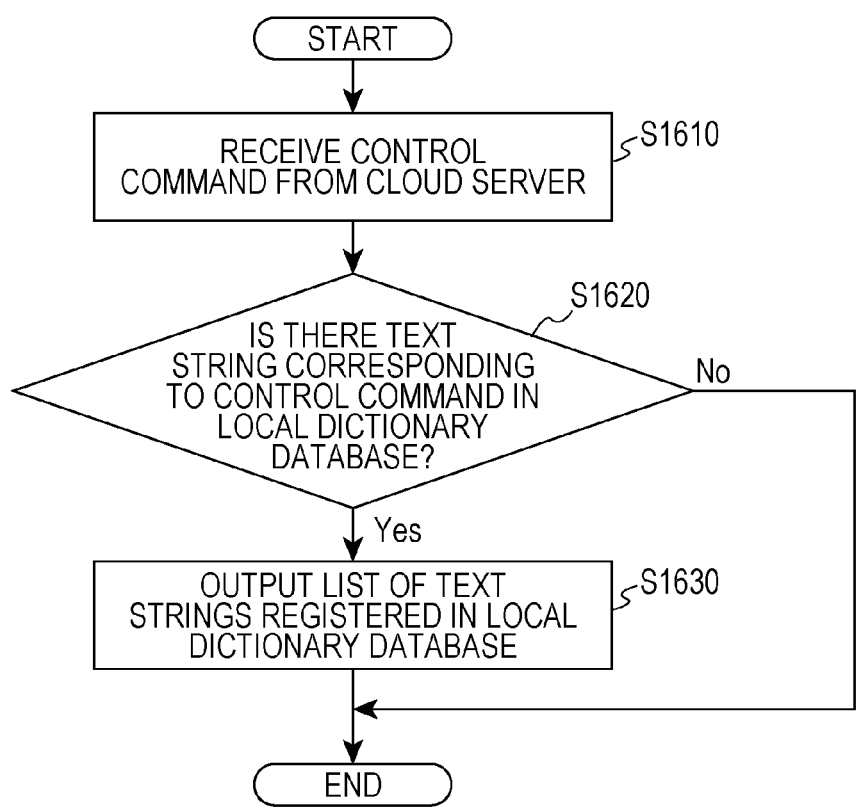
FIG. 19 is a flowchart of text string matching processing at a local server according to the first modification.

A first modification of the processing group A in the operations of the spoken dialog agent system 1 will be described with reference to FIGS. 16 through 19. This modification will be described primarily regarding the points of difference as to the embodiment. FIG. 16 is a sequence diagram relating to a processing group A, out of communication processing where the spoken dialog agent system 1 according to the first modification recommends speech content. FIG. 17 is a flowchart of cloud dictionary matching processing at the cloud server 111 according to the first modification. FIG. 18 is a diagram illustrating the flow of various types of information in the spoken dialog agent system 1 according to the first modification. FIG. 19 is a flowchart of text string matching processing at the local server 102 according to the first modification.

Referencing FIG. 16, in step S15101 in processing group A the cloud server 111 performs cloud dictionary matching processing of text string data received from the local server 102, and outputs a semantic tag corresponding to this text string data, in the same way as in the processing in step S1510 in FIG. 13.

Now, referencing FIGS. 17 and 18, only the processing of steps S1410 and S1420 illustrated in FIG. 14 is performed by the cloud server 111 in the cloud dictionary matching processing according to the present modification. Specifically, the cloud server 111 matches the text string data received from the local server 102 with the cloud dictionary database 690, and outputs a semantic tag corresponding to this text string data, in steps S1410 and S1420. For example, the cloud server 111 receives the text string data "It's so cold I'm shivering", and outputs the semantic tag <heater_on> as a semantic tag corresponding therewith, as illustrated in FIG. 18. Accordingly, in the cloud dictionary matching processing, the cloud server 111 outputs only the semantic tag corresponding to the text string data received from the local server 102.

Returning to FIG. 16, in step S1511 following step S15101, the cloud server 111 matches the semantic tag output in step S15101 with the response generating database 691 and outputs a control command corresponding to the semantic tag. The cloud server 111 transmits the control command along with the gateway ID of the local server 102 that is the object, to that local server 102. Note that the cloud server 111 may transmit the semantic tag output in step S15101 to the local server 102, in addition to the control command, or instead of the control command. In a case where the control command is not transmitted from the cloud server 111, the local server 102 may generate a control command based on the semantic tag received from the cloud server 111.

Thereafter, in step S15131, the local server 102 performs text string matching processing based on the control command. The text string matching processing is processing where the semantic tag corresponding to the control command is matched with the local dictionary database 584, and a text string included in the local dictionary database 584 and corresponding to the control command is output as the object of recommendation. Specifically, the response generating unit 940 of the local server 102 matches the control command with the response generating database 585, and outputs a semantic tag corresponding to a control command. Further, the local dictionary matching unit 930 of the local server 102 matches the output semantic tag with the local dictionary database 584, and outputs a text string corresponding to the semantic tag as an object of recommendation. Thereafter, the response generating unit 940 generates a recommendation message suggesting a text string as the object of recommendation, in the same way as generating of a recommendation message by the cloud server 111 in the embodiment. The response generating unit 940 may match the control command with the response generating database 585 and generate a message corresponding to the control command. Thus, the local server 102 generates a response message including, of a recommendation message and message corresponding to the control command, at least the recommendation message.

More specifically, the text string matching processing in step S15131 can be described as follows, with reference to FIGS. 18 and 19. In step S1610, the local server 102 receives a control command corresponding to the semantic tag from the cloud server 111. For example, the local server 102 receives a control command <command_1> corresponding to the semantic tag <heater_on>, as illustrated in FIG. 18.

Next, in step S1620, the local server 102 determines whether or not the text string corresponding to the control command is registered in the local dictionary matching unit 930. Specifically, the CPU 530 of the local server 102 matches the control command with the response generating unit 940, and outputs a semantic tag corresponding to the control command. The CPU 530 further matches the semantic tag output with the local dictionary database 584, and determines whether or not text strings corresponding to the semantic tag are registered in the local dictionary database 584.

In a case where the text string is found to be registered in the local dictionary database 584 as a result of the determination in step S1620 (Yes in step S1620), in step S1630 the local server 102 outputs a list of text strings corresponding to the semantic tag. For example, the local server 102 outputs at least one of text strings "heater" and "Make it warmer" corresponding to the control command <command_1>, as illustrated in FIG. 18. The number of output text strings may be two or more. Thus, the local server 102 outputs a list of text strings that correspond to the control command and that are registered in the local dictionary database 584. Note that the local server 102 may generate a recommendation message based on the output list of text strings. Further, the local server 102 may match the control command with the response generating database 585 and generate a message corresponding to the control command.

In a case where the text string is found not to be registered in the local dictionary database 584 as a result of the determination in step S1620 (No in step S1620), the local server 102 ends the text string matching processing. This case may include a case where the control command is not registered in the response generating database 585, and a case where no semantic tag that corresponds to the control command is registered in the local dictionary database 584. In such a case, the local server 102 may stop control of the device 101, may not generate a recommendation message, or may not generate a message corresponding to the control command. Alternatively, the local server 102 may notify the user that the speech of the user is inappropriate.

Returning to FIG. 16, in step S1513 following step S15131, the local server 102 performs voice synthesis processing. The CPU 530 of the local server 102 converts the text string of the response message into particular voice data, and transmits to the voice input/output device 240.

Thus, in a case where the user has spoken a speech phrase only registered in the cloud-side dictionary, the spoken dialog agent system 1 according to the first modification can generate, at the local side, a recommendation message recommending a speech phrase registered at the local side that can perform the same processing. Accordingly, processing for generating a recommendation message at the cloud server 111 is unnecessary. It is sufficient for such a cloud server 111 to have just functions of converting the text string data received from the local server 102 into a control command and transmitting this to the local server 102, so a general-purpose cloud server can be applied.

[Second Modification of Spoken Dialog Agent System]

Figure 20:
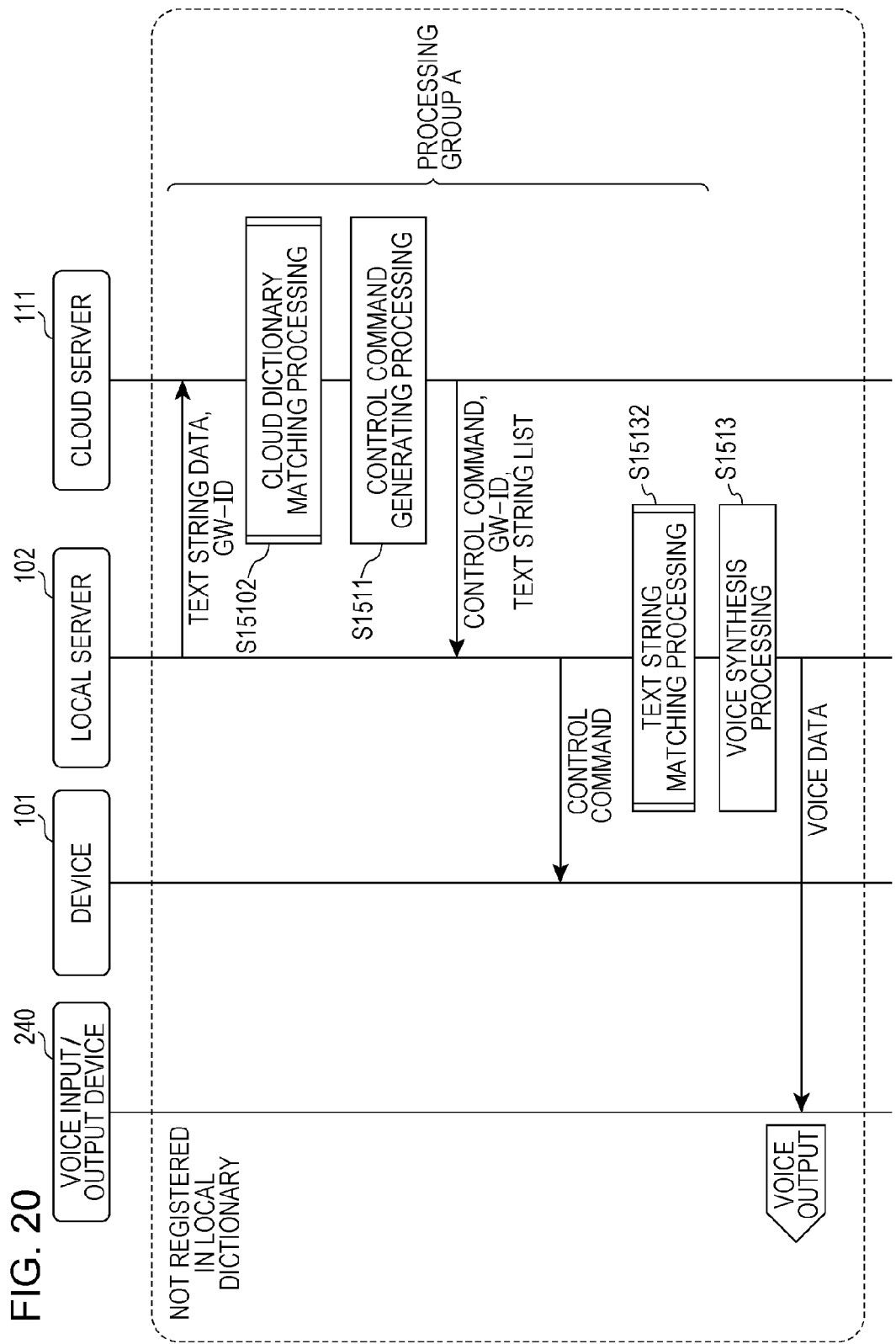
FIG. 20 is a sequence diagram relating to a processing group A, out of communication processing where a spoken dialog agent system according to a second modification recommends speech content.
Figure 21:
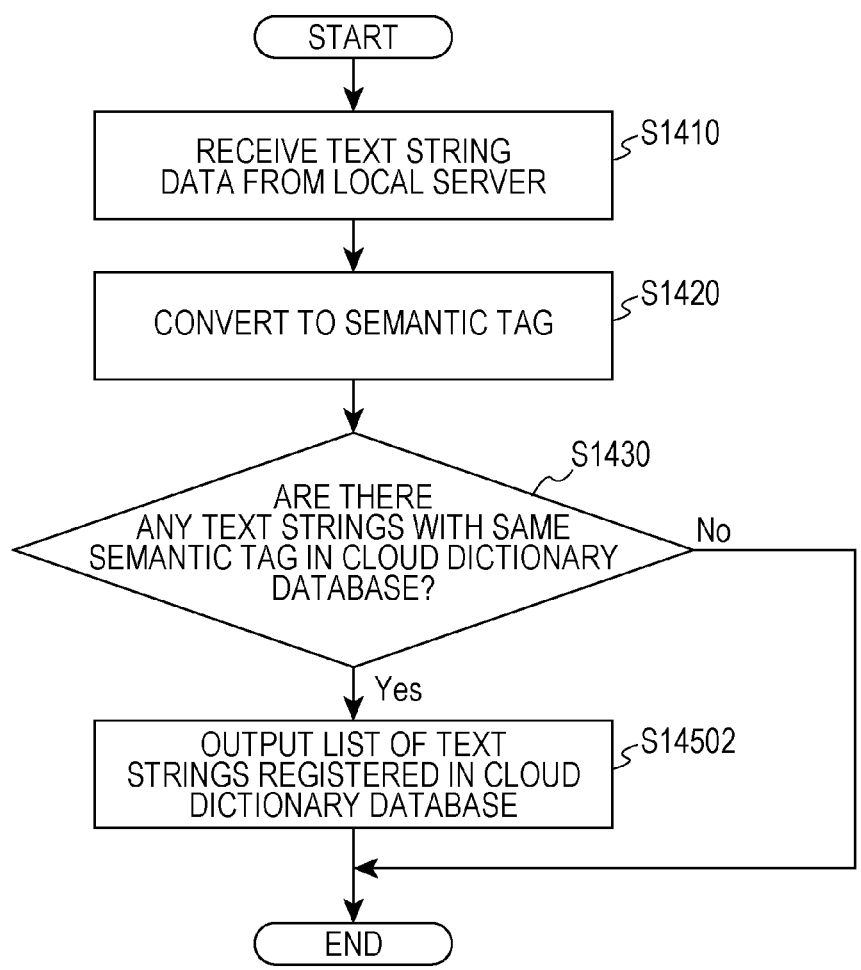
FIG. 21 is a flowchart of cloud dictionary matching processing at a cloud server according to the second modification.
Figure 22:
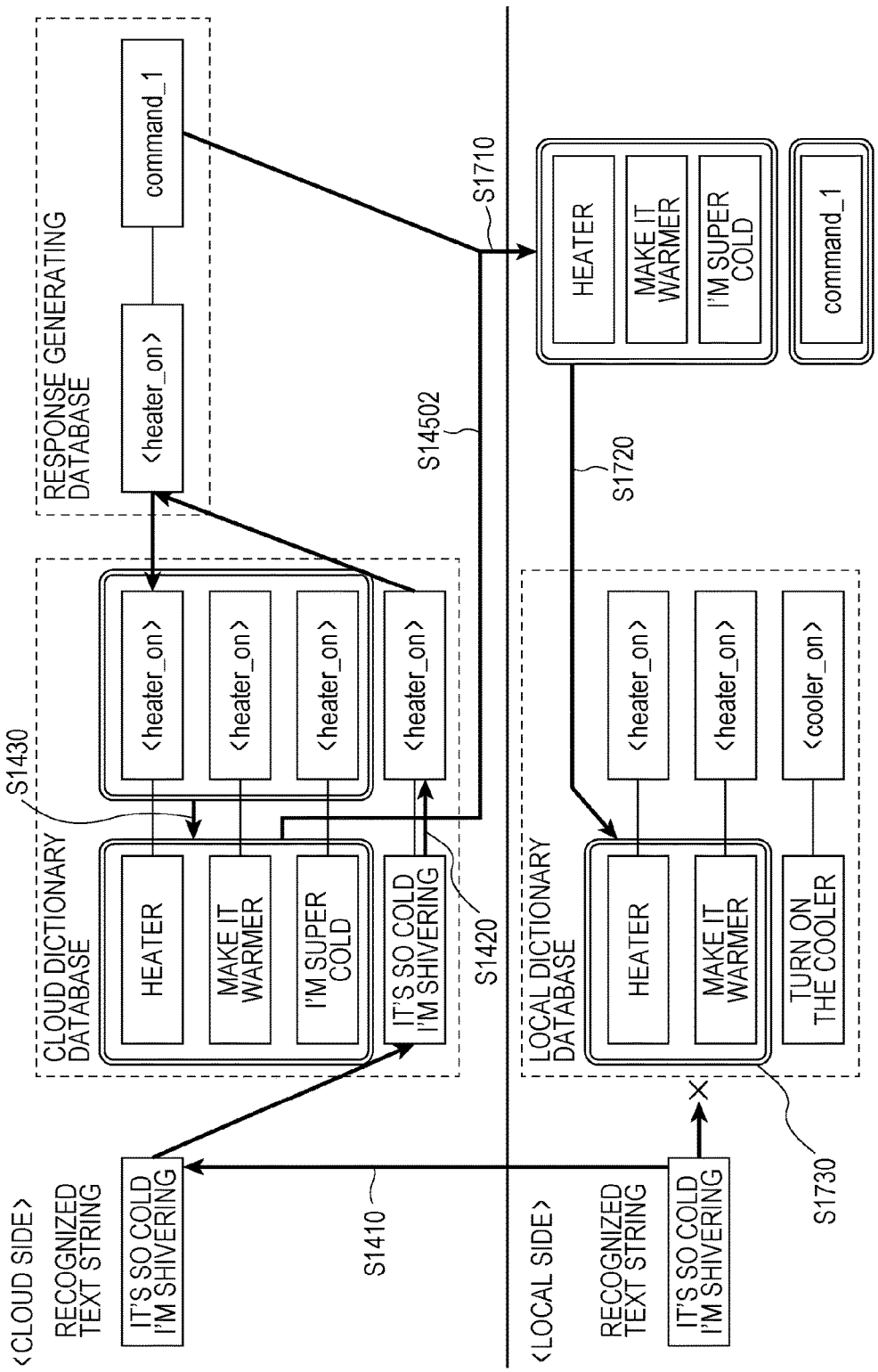
FIG. 22 is a diagram illustrating the flow of various types of information in a spoken dialog agent system according to the second modification.
Figure 23:
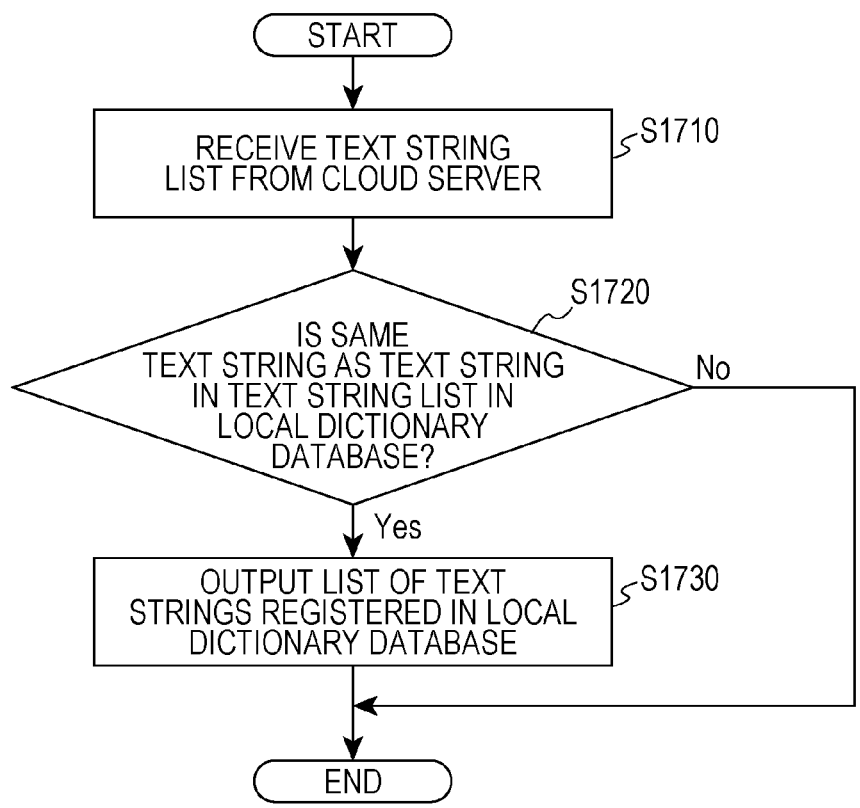
FIG. 23 is a flowchart of text string matching processing at a local server according to the second modification.

A second modification of the processing in processing group A in the operations of the spoken dialog agent system 1 will be described with reference to FIGS. 20 through 23. This modification will be described primarily regarding the points of difference as to the embodiment. FIG. 20 is a sequence diagram relating to the processing group A, out of communication processing where the spoken dialog agent system 1 according to the second modification recommends speech content. FIG. 21 is a flowchart of cloud dictionary matching processing at the cloud server 111 according to the second modification. FIG. 22 is a diagram illustrating the flow of various types of information in the spoken dialog agent system 1 according to the second modification. FIG. 23 is a flowchart of text string matching processing at the local server 102 according to the second modification.

Referencing FIG. 20, in step S15102 in processing group A the cloud server 111 performs cloud dictionary matching processing of text string data received from the local server 102, and outputs a semantic tag corresponding to this text string data, in the same way as in the processing in step S1510 in FIG. 13.

Now, referencing FIGS. 21 and 22, the processing of steps S1410 through S1430 illustrated in FIG. 14 is performed by the cloud server 111 in the cloud dictionary matching processing according to the present modification. Specifically, in steps S1410 and S1420, the cloud server 111 matches the text string data received from the local server 102 with the cloud dictionary database 690, and outputs a semantic tag corresponding to this text string data. For example, the cloud server 111 receives the text string data "It's so cold I'm shivering", and outputs the semantic tag <heater_on> as a semantic tag corresponding therewith. Further, the cloud server 111 determines in step S1430 whether or not other text strings having the same semantic tag as that output in step S1420 are registered in the cloud dictionary database 690.

In a case where other text strings having the same semantic tag are found to be registered in the cloud dictionary database 690 as a result of the determination in step S1430 (Yes in S1430), in step S14502 the cloud server 111 outputs a list of text strings registered in the cloud dictionary database 690 as recommendation objects. On the other hand, in a case where no other text strings having the same semantic tag are found to be registered in the cloud dictionary database 690 (No in S1430), the cloud server 111 performs output of the semantic tag in step S1420, and the cloud dictionary matching processing ends. Thus, according to the present modification, all text strings corresponding to the semantic tag and registered in the cloud dictionary database 690 are output as the object of recommendation, without performing determination of whether registered in the local dictionary database 584 or not. For example, the cloud server 111 outputs text strings "heater", "Make it warmer", etc., corresponding to the semantic tag <heater_on>, as illustrated in FIG. 22.

Returning to FIG. 20, in step S1511 following step S15102, the cloud server 111 matches the semantic tag output in step S15102 with the response generating database 691 and outputs a control command corresponding to the semantic tag. The cloud server 111 also matches the control command with the response generating database 691 and outputs a response message corresponding to the control command. The response message generated in step S1511 can include a message corresponding to the control command, but does not include a recommendation message. For example, the cloud server 111 outputs the control command <command_1> corresponding to the semantic tag <heater_on>, as illustrated in FIG. 22.

The cloud server 111 transmits the text string list output in step S15102 and the control command generated in step S1511 along with the gateway ID, to the local server 102. Note that the cloud server 111 may transmit the semantic tag output in step S15102 to the local server 102, in addition to the control command, or instead of the control command. In a case where the control command is not transmitted from the cloud server 111, or the cloud server 111 does not have the function of generating a control command, for example, the local server 102 may generate a control command based on the semantic tag received from the cloud server 111.

Next, in step S15132, the local server 102 performs text string matching processing based on the text string list received from the cloud server 111. Text string matching processing is processing where text strings included in the text string list are matched with the local dictionary database 584, and text strings included in both the text string list and the local dictionary database 584 are output as the object of recommendation. Specifically, the local dictionary matching unit 930 of the local server 102 matches the text string list with the local dictionary database 584, and outputs text strings that are the objects of recommendation. Further, the response generating unit 940 of the local server 102 generates a recommendation message suggesting the text strings that are the objects of recommendation, as a response message. The response generating unit 940 also matches the control command received from the cloud server 111 with the response generating database 585, and outputs a message corresponding to the control command as a response message.

More specifically, the text string matching processing in step S15132 can be described as follows, with reference to FIGS. 22 and 23. First, in step S1710, the local server 102 receives a text string list from the cloud server 111. For example, the local server 102 receives a text string list including "heater", "Make it warmer", and "I'm super cold" and so forth, as illustrated in FIG. 22.

Next, in step S1720, the local server 102 determines whether or not the text strings in the text string list are registered in the local dictionary database 584. Specifically, the CPU 530 of the local server 102 matches the text string list with the local dictionary database 584, and determines whether or not there are any text strings registered in the local dictionary database 584 that are the same as text strings in the text string list.

In a case where a same text string is found to be registered in the local dictionary database 584 as a result of the determination in step S1720 (Yes in S1720), the local server 102 outputs a list of the text strings registered in the local dictionary database 584. For example, out of the text strings "heater", "Make it warmer", and "I'm super cold", the local server 102 outputs the text strings "heater" and/or "Make it warmer". One or more text strings may be output. The local server 102 further generates a recommendation message based on the output text string list. For example, a recommendation message "Next, time, it would be quicker if you say 'heater' or 'Make it warmer'" is generated. The local server 102 may also match the control command with the response generating database 585 and generate a message corresponding to the control command. On the other hand, in a case where a same text string is not found to be registered in the local dictionary database 584 as a result of the determination in step S1720 (No in S1720), the local server 102 ends the text string matching processing. In such a case, the local server 102 may stop control of the device 101 and notify the user that the speech of the user is inappropriate.

Returning to FIG. 20, in step S1513 following step S15132, the local server 102 performs voice synthesis processing. The CPU 530 of the local server 102 converts the text string of the response message, including the recommendation message and message corresponding top the control command, into particular voice data, and transmits to the voice input/output device 240.

Thus, in a case where the user has spoken a speech phrase registered only in the cloud-side dictionary, the spoken dialog agent system 1 according to the second modification generates, at the local side, a recommendation message recommending a speech phrase registered at the local side that can perform the same processing. Further, all speech phrases registered in the cloud-side dictionary that can perform the same processing are transmitted to the local side. A speech phrase that is the same as a speech phrase registered in the local-side dictionary is output from the received speech phrases at the local side, and recommended. Accordingly, it is unnecessary for the cloud server 111 to perform matching speech phrases having the same semantic tag as the speech phrase received from the local side with speech phrases registered in the local-side dictionary. Such a cloud-side dictionary does not have to include information relating to the local-side dictionary.

[Advantages, etc.]

The cloud server 111 that is one aspect of a speech processing device according to an embodiment of the present disclosure includes the communication unit 1000, the cloud dictionary database 690 serving as a storage unit, the cloud dictionary matching unit 1020 serving as a matching unit, and the response generating unit 1030 serving as an output unit. The communication unit 1000 acquires recognized text information obtained by speech recognition processing. The cloud dictionary database 690 stores, out of a first dictionary of a local dictionary database 584, first dictionary information including information correlating at least text information and task information. Based on the first dictionary information, the cloud dictionary matching unit 1020 identifies at least one of the text information and task information corresponding to recognized text information, using at least one of text information and task information registered in the first dictionary, and at least one of text information and task information identified from a second dictionary of the cloud dictionary matching unit 1020 that differs from the first dictionary, and recognized text information. The response generating unit 1030 outputs presentation information regarding at least one of the text information and task information corresponding to the recognized text information. The presentation information includes information relating to suggested text information. Suggested text information is text information registered in both the first dictionary and the second dictionary, task information that corresponds to the suggested text information corresponds to task information that corresponds to recognized text information, and further, the suggested text information is different from the recognized text information.

Note that the first dictionary information is information relating to the first dictionary registered in the local dictionary database 584, and includes information correlating the text information and task information of the first dictionary. For example, the first dictionary information may include information relating to the correlation between the second dictionary registered in the cloud dictionary database 690 and the first dictionary registered in the local dictionary database 584. For example, the first dictionary information may include information relating to the correlation of text strings and semantic tags of the second dictionary, and the status of whether or not these are registered in the local dictionary database 584. The first dictionary information may include the entire contents of the first dictionary. Note that task information may include at least one of a control command and a semantic tag. For example, presentation information may include at least one or more of a recommendation message, task information of recognized text information, and a text string for an object of recommendation, as information relating to suggested text information.

In the above-described configuration, presentation information including information relating to suggested text information is output. Task information corresponding to suggested text information corresponds to task information of recognized text information. Further, suggested text information is registered in both the first dictionary and the second dictionary. For example, in a case where suggested text information is not registered in the first dictionary in the local dictionary database 584 but is registered in the second dictionary in the cloud dictionary database 690, at least one of text information and task information corresponding to the recognized text information is identified by matching performed by the cloud dictionary matching unit 1020. For task information of the recognized text information, text information corresponding to this task information is selected from the identified text information, and further, text information registered in both the first dictionary and the second dictionary is selected from the selected text information. This text information is suggested text information that is registered in the first dictionary in the local dictionary database 584 and also that has task information corresponding to the recognized text information. By suggesting such suggested text information, the user can thereafter issue an instruction using the text string registered in the local dictionary database 584. Accordingly, processing in response to user instructions can be maximally performed at the local side, thereby improving processing speed. That is to say, in a case of the user speaking a speech phrase only registered in the cloud-side dictionary, a recommendation is made to the user of a speech phrase registered at the local-side dictionary that performs the same processing, so response is improved for the user performing device control by voice.

In the cloud server 111 that is one aspect of a speech processing device according to an embodiment, the cloud dictionary database 690 stores the second dictionary. The cloud dictionary matching unit 1020 identifies task information corresponding to recognized text information, and other text information that corresponds to task information corresponding to the recognized text information and also is different from the recognized text information. Note that suggested text information includes the other text information. Presentation information includes task information corresponding to the recognized text information, and information relating to the suggested text information.

In the above-described configuration, the cloud server 111 identifies in the cloud dictionary database 690 and outputs task information corresponding to recognized text information, and information relating to suggested text information including the other text information of the recognized text information. For example, in a case where recognized text information is not registered in the first dictionary in the local dictionary database 584 but is registered in the second dictionary in the cloud dictionary database 690, the cloud server 111 identifies the task information and suggested text information using the cloud dictionary database 690. Accordingly, identifying processing of the task information and suggested text information can be performed at the cloud server 111 side alone, so processing speed can be improved. Further, the local server 102 can perform control of the device 101 and presentation of suggested text information to the user at the local server 102 side, using the task information and suggested text information received from the cloud server 111.

Further, in the cloud server 111 that is one aspect of a speech processing device according to an embodiment, the other text information identified in the second dictionary in the cloud dictionary database 690 is text information also registered in the first dictionary in the local dictionary database 584. In the above-described configuration, the other text information is text information registered in both the second dictionary in the cloud dictionary database 690 and the first dictionary in the local dictionary database 584.

Also, in the cloud server 111 that is one aspect of a speech processing device according to the second modification, with regard to the other text information identified in the second dictionary in the cloud dictionary database 690, a plurality of pieces is identified, part of the plurality of pieces of other text information being text information also registered in the first dictionary in the local dictionary database 584. In the above-described configuration, the plurality of pieces of other text information may include text information registered in the first dictionary in the local dictionary database 584 and text information not registered in the first dictionary in the local dictionary database 584. For example, upon receiving the plurality of pieces of other text information from the cloud server 111, the local server 102 can extract text information registered in the local dictionary database 584 by matching the plurality of pieces of other text information with the first dictionary in the local dictionary database 584. In this case, it is sufficient for the cloud server 111 to extract text information where task information corresponds with the recognized text information, and there is no need to distinguish whether the extracted text information is registered in both the second dictionary in the cloud dictionary database 690 and the first dictionary in the local dictionary database 584. Accordingly, a general-purpose cloud server 111 can be used.

In the cloud server 111 that is one aspect of a speech processing device according to the first modification, the cloud dictionary matching unit 1020 identifies task information corresponding to recognized text information in the second dictionary in the cloud dictionary database 690, the presentation information including task information identified by the cloud dictionary matching unit 1020, as information relating to suggested text information. In the above configuration, it is sufficient for the cloud server 111 to output task information corresponding to the recognized text information identified in the cloud dictionary database 690, and there is no need to extract text information where task information corresponds to recognized text information. Accordingly, a general-purpose cloud server 111 can be used.

The cloud server 111 that is one aspect of a speech processing device according to an embodiment includes the communication unit 1000 that transmits presentation information. In the above-described configuration, the cloud server 111 transmits presentation information by communication. Accordingly, the cloud server 111 can be situated at a location distanced from the local server 102. The local server 102 can be installed in various facilities without being affected by the cloud server 111.

The local server 102 that is another aspect of a speech processing device according to an embodiment of the present disclosure includes the voice recognition unit 920 serving as an acquisition unit, the local dictionary database 584 serving as a storage unit, the local dictionary matching unit 930 serving as a matching unit, and the response generating unit 940 and voice synthesis unit 950 serving as an output unit. The voice recognition unit 920 acquires recognized text information obtained by speech recognition processing. The local dictionary database 584 stores first dictionary information having information correlating at least text information and task information in the first dictionary in the local dictionary database 584. Based on the first dictionary information, the local dictionary matching unit 930 identifies at least one of the text information and task information corresponding to the recognized text information using at least one of the text information and task information registered in the first dictionary, and at least one of text information and task information identified from the second dictionary in the cloud dictionary database 690 that is different from the first dictionary and the recognized text information. The response generating unit 940 and voice synthesis unit 950 output presentation information regarding at least one of text information and task information corresponding to the recognized text information. The presentation information includes information relating to suggested text information. The suggested text information is text information registered in both the first dictionary and the second dictionary, task information corresponding to the suggested text information corresponds to task information corresponding to the recognized text information, and further, the suggested text information is different from the recognized text information. Note that the first dictionary information may be the first dictionary registered in the local dictionary database 584. Task information may include at least one of a control command and a semantic tag. For example, presentation information may include a response message including a recommendation message, as information relating to the suggested text information.

In the above-described configuration, presentation information including information relating to suggested text information is output. The task information corresponding to the suggested text information corresponds to the task information of the recognized text information. Further, the suggested text information is registered in both of the first dictionary and the second dictionary. For example, in a case where there is recognized text information not registered in the first dictionary in the local dictionary database 584 but registered in the second dictionary in the cloud dictionary database 690, the local server 102 outputs presentation information including information relating to the suggested text information. This suggested text information is different from the recognized text information, but is text information where the task information corresponds to the recognized text information and the task information is registered in both the first dictionary and the second dictionary. That is to say, this is text information that is registered in the local dictionary database 584 and that the task information corresponds to the recognized text information. By suggesting such suggested text information, the user can thereafter issue an instruction using the text string registered in the local dictionary database 584. Accordingly, processing in response to user instructions can be maximally performed at the local side, thereby improving processing speed.

In the local server 102 that is another aspect of a speech processing device according to an embodiment, the local dictionary matching unit 930 identifies task information corresponding to recognized text information in the first dictionary in the local dictionary database 584. In the above-described configuration, the local server 102 can perform control of the device 101 connected to the local server 102 by identifying task information corresponding to recognized text information.

The local server 102 that is another aspect of a speech processing device according to an embodiment further includes a communication unit 900, the communication unit 900 receiving task information identified by the second dictionary in the cloud dictionary database 690 and recognized text information. The first dictionary information is the first dictionary in the local dictionary database 584. The local dictionary matching unit 930 identifies text information corresponding to received task information in the first dictionary in the local dictionary database 584 as suggested text information. According to the above-described configuration, even in a case where only task information corresponding to the recognized text information can be received from the cloud server 111, the local server 102 can acquire and output suggested text information, using the acquired task information. Accordingly, it is sufficient for the cloud server 111 to output task information corresponding to the recognized text information, and there is no need to distinguish whether the text information corresponding to this task information is registered in both the second dictionary in the cloud dictionary database 690 and the first dictionary in the local dictionary database 584. Accordingly, a general-purpose cloud server 111 can be used.

The local server 102 that is another aspect of a speech processing device according to an embodiment further includes a communication unit 900, the communication unit 900 receiving text information identified by the second dictionary in the cloud dictionary database 690 and recognized text information. The first dictionary information is the first dictionary in the local dictionary database 584. The local dictionary matching unit 930 identifies text information in the received text information that is registered in the first dictionary in the local dictionary database 584 as suggested text information. Note that the received text information may be text information including one or more text strings. In the above configuration, it is sufficient for the cloud server 111 to output suggested text information, and there is no need to distinguish whether the suggested text information is registered in both the second dictionary in the cloud dictionary database 690 and the first dictionary in the local dictionary database 584. Accordingly, a general-purpose cloud server 111 can be used.

The local server 102 that is another aspect of a speech processing device according to an embodiment includes the transmission data generating unit 960 serving as a presentation control unit that presents presentation information on another presentation device. In the above configuration, the local server 102 presents presentation information based on information received from the cloud server 111 for example, on a separate device such as the device 101 or the like, thereby notifying the user.

A speech processing device that is yet another aspect of an embodiment includes a local server 102 serving as a local device and a cloud server 111 serving as a cloud device, that exchange information with each other. The local server 102 includes the voice recognition unit 920 that acquires recognized text information obtained by speech recognition processing, the local dictionary database 584 serving as a first storage unit that stores a first dictionary correlating text information and task information, the local dictionary matching unit 930 serving as a first matching unit, and the response generating unit 940 and voice synthesis unit 950 serving as a first output unit. The cloud server 111 includes the cloud dictionary database 690 serving as a second storage unit storing the second dictionary correlating text information and task information, the cloud dictionary matching unit 1020 serving as a second matching unit, and the response generating unit 1030 serving as a second output unit. The cloud dictionary matching unit 1020 matches at least one of text information and task information registered in the first dictionary in the local dictionary database 584, and at least one of text information and task information identified from the second dictionary in the cloud dictionary database 690, and identifies at least one of the text information and task information corresponding to recognized text information. The response generating unit 1030 outputs presentation information regarding at least one of the text information and task information corresponding to the recognized text information, to the local server 102. Note that the presentation information includes information relating to suggested text information. Suggested text information is text information registered in both the first dictionary and the second dictionary, task information corresponding to the suggested text information that corresponds to recognized text information, and further, the suggested text information is different from the recognized text information. The local dictionary matching unit 930 matches presentation information received form the cloud server 111 with at least one of text information and task information registered in the first dictionary. The response generating unit 940 and voice synthesis unit 950 output information relating to the suggested text information as a message such as voice or the like.

The above-described configuration yields advantages the same as the advantages provided by the cloud server 111 and local server 102 according to aspects of the speech processing device according to embodiments. Particularly, in a case where the user speaks a speech phrase registered only in the cloud-side cloud dictionary database 690, a speech phrase recorded in the local-side local dictionary database 584 that performs the same processing is recommended to the user, thereby improving response when the user performs device control by voice.

In the cloud server 111 and local server 102 in various aspects of a speech processing device according to embodiments and modifications, task information includes at least one of semantic information relating to the meaning of text information and control information for controlling actions of the device. Semantic information and control information are correlated, with text information being correlated with at least one of the semantic information and control information. Note that common semantic information may be given to synonymous text information of which the meaning is similar. For example, semantic information may be a semantic tag, and control information may be a control command. According to the above-described configuration, control based on text information is smooth, due to the text information being correlated with at least one of the semantic information and control information. Semantic information is also held in common among pieces of text information with similar meanings, and further, the control information corresponds to the semantic information held in common. Thus, task information regarding text information with similar meanings is unified. Accordingly, the number of variations of task information is reduced, whereby speed of processing by the cloud server 111 and local server 102 based on task information improves.

A speech processing method according to one aspect of an embodiment includes acquiring recognized text information obtained by speech recognition processing, identifying at least one of text information and task information corresponding to recognized text information, using at least one of text information and task information registered in a first dictionary, and at least one of text information and task information identified from a second dictionary that differs from the first dictionary, and recognized text information, based on first dictionary information having information correlating at least text information and task information of the first dictionary, and outputting presentation information regarding at least one of the text information and task information corresponding to the recognized text information. The presentation information includes information relating to suggested text information, suggested text information is text information registered in both the first dictionary and the second dictionary, task information that corresponds to the recognized text information corresponds to task information that corresponds to suggested text information, and the suggested text information is different from the recognized text information.

The above-described speech processing method yields advantages the same as the advantages provided by the speech processing device according to embodiments. The above method may be realized by a processor such as a microprocessor unit (MPU) or a CPU, a circuit such as a large-scale integration (LSI) or the like, an integrated circuit (IC) card, a standalone module, or the like.

The processing of the embodiment and modifications may be realized by a software program or digital signals from a software program. For example, processing of the embodiment is realized by a program such as that below.

That is to say, a program causes a computer to execute the following functions of acquiring recognized text information obtained by speech recognition processing, identifying at least one of text information and task information corresponding to recognized text information, using at least one of text information and task information registered in a first dictionary, and at least one of text information and task information identified from a second dictionary that differs from the first dictionary, and recognized text information, based on first dictionary information having information correlating at least text information and task information of the first dictionary, and outputting presentation information regarding at least one of the text information and task information corresponding to the recognized text information. The presentation information includes information relating to suggested text information, suggested text information is text information registered in both the first dictionary and the second dictionary, task information that corresponds to the recognized text information corresponds to task information that corresponds to suggested text information, and further, the suggested text information is different from the recognized text information.

[Other]

Although a speech processing device and so forth according to an embodiment and modifications has been described above as examples of technology disclosed in the present disclosure, the present disclosure is not restricted to the embodiment and modifications. The technology in the present disclosure is also applicable to modifications of the embodiment to which modifications, substitutions additions, omissions, and so forth have been performed as appropriate, and other embodiments as well, as appropriate. The components described in the embodiment and modifications can be combined to form new embodiments or modifications.

As described above, general or specific embodiments of the present disclosure may be realized as a system, a method, an integrated circuit, a computer program, a recording medium such as a computer-readable CD-ROM, and so forth. General or specific embodiments of the present disclosure may also be realized as any combination of a system, method, integrated circuit, computer program, and recording medium.

The processing units included in the speech processing device according to the above-described embodiment and modifications are typically realized as an LSI which is an integrated circuit. These may be individually formed into single chips, or part or all may be formed into a single chip.

The integrated circuit is not restricted to an LSI, and may be realized by dedicated circuits or general-purpose processors. A field programmable gate array (FPGA) capable of being programmed after manufacturing the LSI, or a reconfigurable processor of which the connections and settings of circuit cells within the LSI can be reconfigured, may be used.

In the above-described embodiment and modifications, the components may be configured as dedicated hardware, or may be realized by executing a software program suitable for each component. Each component may be realized by a program execution unit such as a CPU or other processor or the like reading out a software program recorded in a recording medium such as a hard disk, semiconductor memory, or the like, and executing the software program.

Further, the technology of the present disclosure may be the above-described program, or may be a non-transient computer-readable recording medium in which the above-described program is recorded. It is needless to say that the above-described program may be distributed through a transfer medium such as the Internet or the like.

Also, the numbers used above, such as ordinals, numerical quantities, and so forth, are all only exemplary to describe the technology of the present disclosure in a specific manner, and the present disclosure is not restricted to the exemplified numbers. Also, the connection relations between components are only exemplary to describe the technology of the present disclosure in a specific manner, and connection relations to realize the function of the present disclosure are not restricted to these.

Also, the functional block divisions in the block diagrams are only exemplary, and multiple function blocks may be realized as a single functional block, or a single functional block may be divided into a plurality, or a part of the functions may be transferred to another functional block. Functions of multiple functional blocks having similar functions may be processed in parallel or time-division by a single hardware or software.

While a speech processing device and so forth according to one aspect have been described by way of embodiment and modifications, the present disclosure is not restricted to these embodiment and modifications. Various modifications to the embodiments and combinations of components of different embodiments which are conceivable by one skilled in the art may be encompassed by one aspect without departing from the essence of the present disclosure.

Note that the present disclosure is applicable as long as related to dialog between a spoken dialog agent system and a user. For example, the present disclosure is effective in a case where a user operates an electric home appliance or the like using the spoken dialog agent system. Assuming a case of a user operating a microwave or an oven capable of handling voice operations by giving an instruction "heat it up", the spoken dialog agent system can ask the user back for specific instructions, such as "heat it for how many minutes?" or "heat it to what temperature?" or the like, for example. The only user who is allowed to reply to this (the user regarding whom the agent system will accept instructions in response to its own question) is the user who gave the initial instruction of "heat it up".

Additionally, the present disclosure is also applicable to operations where the spoken dialog agent system asks back for specific content in response to abstract instructions given by the user. The content that the spoken dialog agent system asks the user back of may be confirmation regarding execution of an action or the like.

In the above-described aspect, input of voice by the user may be performed by a microphone that the system or individual home electric appliances have. Also, the spoken dialog agent system asking back to the user may be performed by a speaker or the like that the system or individual home electric appliances have.

In the present disclosure, "operation" may be an action of outputting voice to the user via a speaker, for example. That is to say, in the present disclosure, a "device" to be controlled may be a voice input/output device (e.g., a speaker).

In the present disclosure, "computer", "processor", "microphone", and/or "speaker" may be built into a "device" to be controlled, for example.

Note that the technology described in the above aspect may be realized by the following type of cloud service, for example. However, the type of cloud service by which the technology described in the above aspect can be realized is not restricted to this.

Description will be made in order below regarding an overall image of service provided by an information management system using a type 1 service (in-house data center type cloud service), an overall image of service provided by an information management system using a type 2 service (IaaS usage type cloud service), an overall image of service provided by an information management system using a type 3 service (PaaS usage type cloud service), and an overall image of service provided by an information management system using a type 4 service (SaaS usage type cloud service).

[Service Type 1: In-House Data Center Type Cloud Service]

Figure 24:
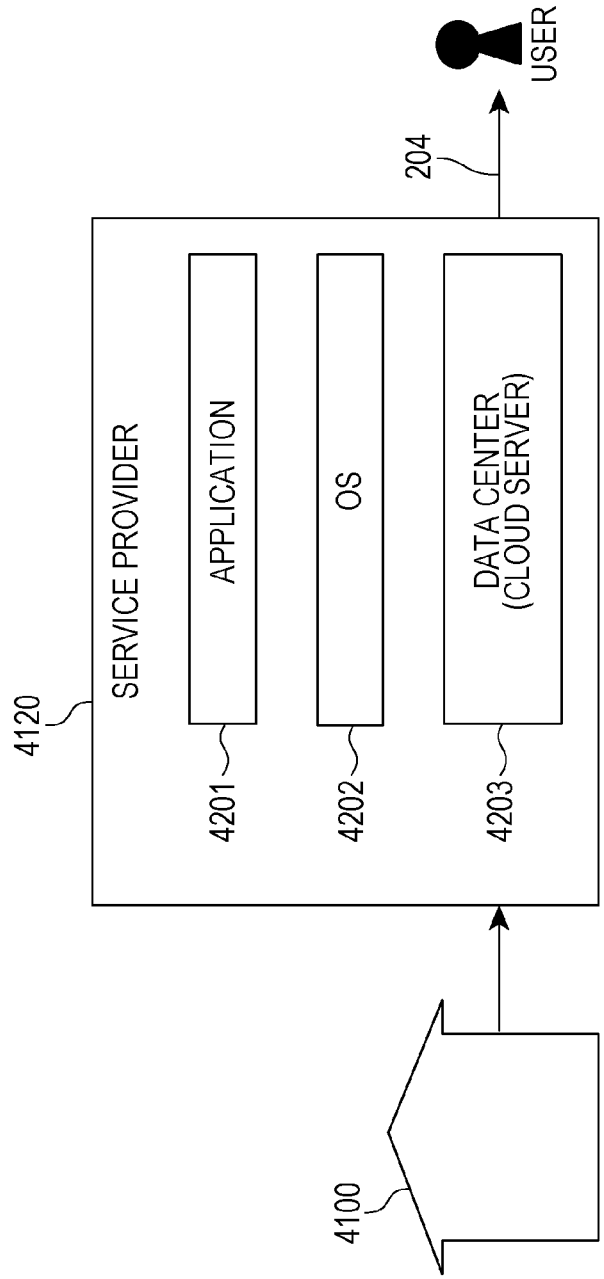
FIG. 24 is a diagram illustrating an overall image of service provided by an information management system according to a type 1 service (in-house data center type cloud service), to which the spoken dialog agent system according to the embodiment and modifications is applicable.

FIG. 24 is a diagram illustrating the overall image of services which the information management system provides in a service type 1 (in-house data center type cloud service), to which the spoken dialog agent system according to the embodiment and modifications is applicable. In this type, a service provider 4120 obtains information from a group 4100, and provides a user with service, as illustrated in FIG. 24. In this type, the service provider 4120 functions as a data center operator. That is to say, the service provider 4120 has a cloud server 111 to manage big data. Accordingly, the data center operator does not exist.

In this type, the service provider 4120 operates and manages the data center 4203 (cloud server). The service provider 4120 also manages operating system (OS) 4202 and applications 4201. The service provider 4120 provides services (arrow 204) using the OS 4202 and applications 4201 managed by the service provider 4120.

[Service Type 2: IaaS Usage Type Cloud Service]

Figure 25:
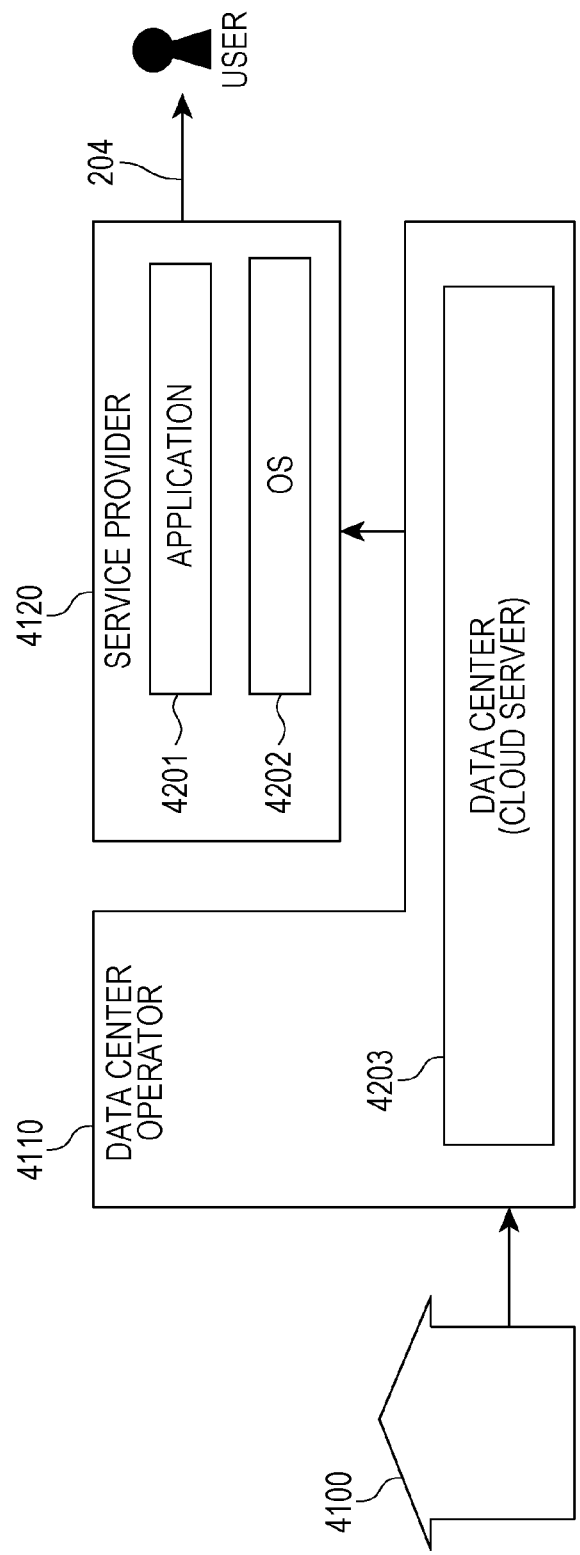
FIG. 25 is a diagram illustrating an overall image of service provided by an information management system according to a type 2 service (IaaS usage type cloud service), to which the spoken dialog agent system according to the embodiment and modifications is applicable.

FIG. 25 is a diagram illustrating the overall image of services which the information management system provides in a service type 2 (IaaS usage type cloud service), to which the spoken dialog agent system according to the embodiment and modifications is applicable. IaaS stands for "Infrastructure as a Service", and is a cloud service providing model where the base for computer system architecture and operation itself is provided as an Internet-based service.

In this type, the data center operator 4110 operates and manages the data center 4203 (cloud server), as illustrated in FIG. 25. The service provider 4120 manages the OS 4202 and applications 4201. The service provider 4120 provides services (arrow 204) using the OS 4202 and applications 4201 managed by the service provider 4120.

[Service Type 3: PaaS Usage Type Cloud Service]

Figure 26:
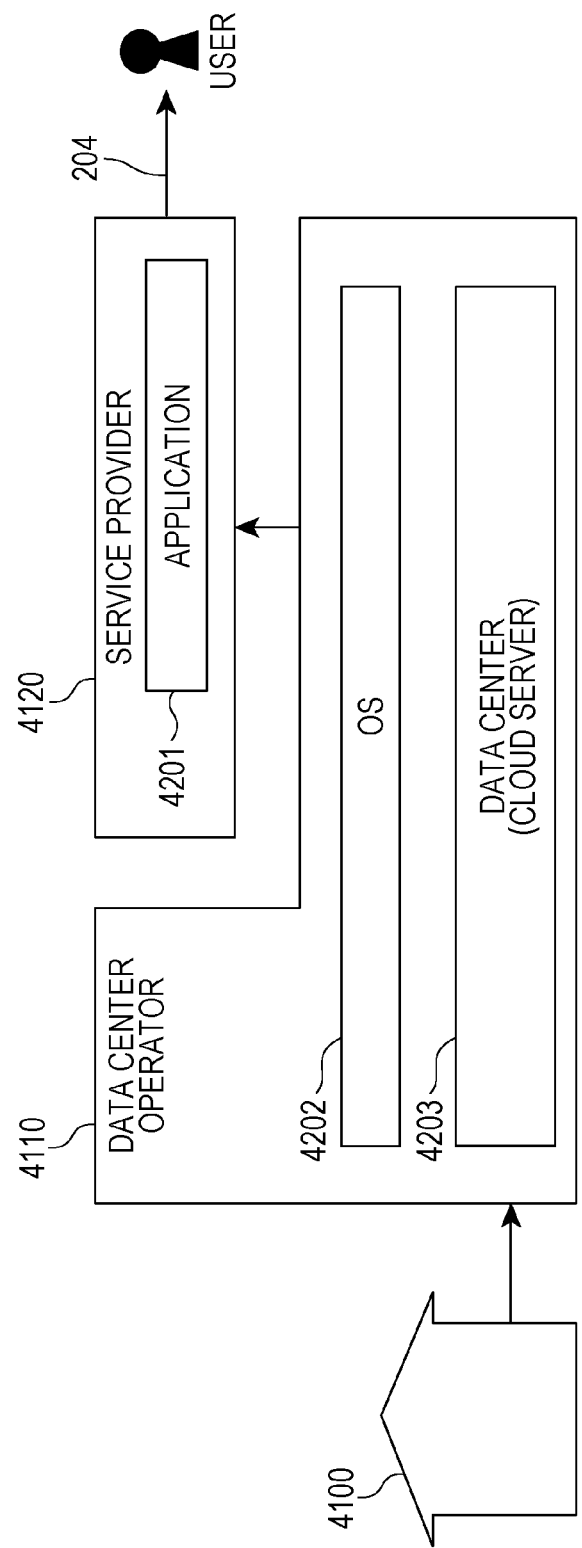
FIG. 26 is a diagram illustrating an overall image of service provided by an information management system according to a type 3 service (PaaS usage type cloud service), to which the spoken dialog agent system according to the embodiment and modifications is applicable.

FIG. 26 is a diagram illustrating the overall image of services which the information management system provides in a service type 3 (PaaS usage type cloud service), to which the spoken dialog agent system according to the embodiment and modifications is applicable. PaaS stands for "Platform as a Service", and is a cloud service providing model where a platform serving as the foundation for software architecture and operation is provided as an Internet-based service.

In this type, the data center operator 4110 manages the OS 4202 and operates and manages the data center 4203 (cloud server), as illustrated in FIG. 26. The service provider 4120 also manages the applications 4201. The service provider 4120 provides services (arrow 204) using the OS 4202 managed by the data center operator 4110 and applications 4201 managed by the service provider 4120.

[Service Type 4: SaaS Usage Type Cloud Service]

Figure 27:
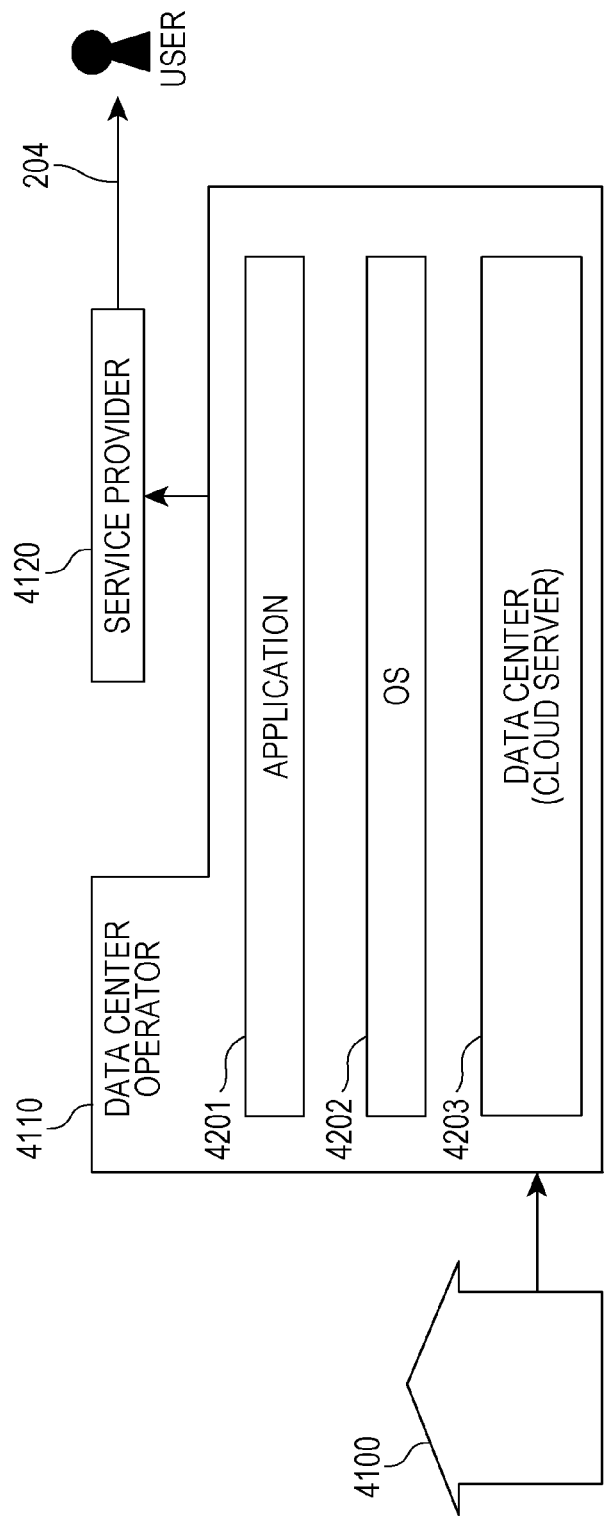
FIG. 27 is a diagram illustrating an overall image of service provided by an information management system according to a type 4 service (SaaS usage type cloud service), to which the spoken dialog agent system according to the embodiment and modifications is applicable.

FIG. 27 is a diagram illustrating the overall image of services which the information management system provides in a service type 4 (SaaS usage type cloud service), to which the spoken dialog agent system according to the embodiment and modifications is applicable. SaaS stands for "Software as a Service". A SaaS usage type cloud service is a cloud service providing model having functions where users such as corporations, individuals, or the like who do not have a data center (cloud server) can use applications provided by a platform provider having a data center (cloud server) for example, over a network such as the Internet.

In this type, the data center operator 4110 manages the applications 4201, manages the OS 4202, and operates and manages the data center 4203 (cloud server), as illustrated in FIG. 27. The service provider 4120 provides services (arrow 204) using the OS 4202 and applications 4201 managed by the data center operator 4110.

In each of these types, the service provider 4120 performs the act of providing services. The service provider or data center operator may develop the OS, applications, database for big data, and so forth, in-house, or may commission this to a third party.

What is claimed is:

1. A method to be executed at least in part in a computer for controlling at least one device through dialog with a user, the method comprising:
   acquiring first voice information, indicating a voice of a user input by the user, from a microphone;
   generating first text string information from the first voice information;
   referencing a first database via a bus and/or a first network, which is a private network, by the computer and determining whether the first text string information matches any piece of text string information registered in the first database;
   outputting, to a server via a second network, the first text string information when it is determined that the first text string information does not match any piece of text string information registered in the first database;
   when the first text string information matches a piece of text string information in a second database, acquiring, from the server via the second network, (i) first semantic information associated with the piece of text string information in the second database and/or a control command corresponding to the first semantic information, and (ii) one or more pieces of text string information associated with the first semantic information in the second database;
   instructing the at least one device to execute an operation in accordance with the first semantic information and/or the control command;
   retrieving, from the first database, second text string information that matches one of the one or more pieces of text string information acquired from the server; and
   outputting, to a speaker, second voice information generated from the second text string information.

2. The method according to claim 1, further comprising:
   converting the second text string information to the second voice information.

3. The method according to claim 1, further comprising:
   generating a control command based on the first semantic information.

4. The method according to claim 1, further comprising:
   converting the first voice information to the first text string information.

5. The method according to claim 1, wherein
   the second network is the Internet, and
   the first database is stored in a local server that is communicable with the at least one device without through the Internet.

6. The method according to claim 1, further comprising:
   instructing the at least one device to execute the operation without communicating with the server, when determining that the first text string information matches one of the plurality of pieces of text string information registered in the first database.

7. A non-transitory storage medium storing a program that causes the computer to execute the method according to claim 1.

8. A method to be executed at least in part in a computer for controlling at least one device through dialog with a user, the method comprising:
   acquiring first voice information, indicating a voice of a user input by the user, from a microphone;
   generating first text string information from the first voice information;
   referencing a first database via a bus and/or a first network, which is a private network, by the computer and determining whether the first text string information matches any piece of text string information registered in the first database;
   outputting, to a server via a second network, the first text string information when it is determined that the first text string information does not match any piece of text string information registered in the first database;
   when the first text string information matches a piece of text string information in a second database, acquiring, from the server via the second network, first semantic information associated with the piece of text string information in the second database;
   instructing the at least one device to execute an operation in accordance with the first semantic information;
   retrieving, from the first database, second text string information that matches the first semantic information; and
   outputting, to a speaker, second voice information generated from the second text string information.

9. The method according to claim 8, further comprising:
   converting the second text string information to the second voice information.

10. The method according to claim 8, further comprising:
    generating a control command based on the first semantic information.

11. The method according to claim 8, further comprising:
    converting the first voice information to the first text string information.

12. The method according to claim 8, wherein
    the second network is the Internet, and
    the first database is stored in a local server that is communicable with the at least one device without through the Internet.

13. The method according to claim 8, further comprising:
    instructing the at least one device to execute the operation without communicating with the server, when it i determined that the first text string information matches any piece of text string information registered in the first database.

14. The method according to claim 8, wherein the server has no information indicating what text string information is registered in the first database.

15. A non-transitory storage medium storing a program that causes the computer to execute the method according to claim 8.

16. The method according to claim 1, wherein the server has no information indicating what text string information is registered in the first database.

\* \* \* \* \*